United States Patent
Rollins et al.

(10) Patent No.: US 10,411,561 B2
(45) Date of Patent: Sep. 10, 2019

(54) COOLING SCHEMES AND METHODS FOR COOLING TOWER MOTORS

(71) Applicant: Prime Datum, Inc., Canandaigua, NY (US)

(72) Inventors: Patrick M. Rollins, Canandaigua, NY (US); George Lucas, Hammandsport, NY (US)

(73) Assignee: Prime Datum Development Company, LLC, Canandaigua, NY (US)

( * ) Notice: Subject to any disclaimer, the term of this patent is extended or adjusted under 35 U.S.C. 154(b) by 168 days.

(21) Appl. No.: 15/327,728

(22) PCT Filed: Jul. 21, 2015

(86) PCT No.: PCT/US2015/041422
§ 371 (c)(1),
(2) Date: Jan. 20, 2017

(87) PCT Pub. No.: WO2016/014600
PCT Pub. Date: Jan. 28, 2016

(65) Prior Publication Data
US 2017/0207682 A1    Jul. 20, 2017

Related U.S. Application Data

(60) Provisional application No. 62/049,105, filed on Sep. 11, 2014, provisional application No. 62/027,100, filed on Jul. 21, 2014.

(51) Int. Cl.
*H02K 9/06*    (2006.01)
*H02K 1/32*    (2006.01)
(Continued)

(52) U.S. Cl.
CPC .............. *H02K 9/06* (2013.01); *F28C 1/00* (2013.01); *F28F 25/06* (2013.01); *F28F 25/10* (2013.01);
(Continued)

(58) Field of Classification Search
CPC ....... F28C 1/00; F28C 2001/006; F28F 25/06; F28F 25/10; F28F 2025/005;
(Continued)

(56) References Cited

U.S. PATENT DOCUMENTS 1,726,214 A * 8/1929 Comins ................. F24F 6/06
261/30
1,844,313 A * 2/1932 Dean et al. ............ F28C 1/00
261/109
(Continued)

OTHER PUBLICATIONS

Supplemental European Search Report.

*Primary Examiner* — Charles S Bushey
(74) *Attorney, Agent, or Firm* — Raymond Nuzzo

(57) ABSTRACT

The present invention provides techniques, schemes configurations and methods for removing or reducing heat in motors. In one embodiment, the present invention is directed to a cooling tower comprising a cooling tower structure and a motor supported by the cooling tower structure. The motor comprises a motor casing and a rotatable shaft. The cooling tower further comprises a cooling tower fan that comprises a fan hub, a plurality of fan blades attached to the rotatable shaft and a supplemental fan attached to the fan hub such that the supplemental fan is between the fan hub and the motor. Rotation of the cooling tower fan causes rotation of the supplemental fan which increases airflow around the casing of the motor so as to facilitate cooling of the motor. Other embodiments of configurations, schemes, method and techniques for thermally managing motors are described herein in detail.

3 Claims, 25 Drawing Sheets

(51) Int. Cl.
  *H02K 9/02* (2006.01)
  *H02K 9/22* (2006.01)
  *F28C 1/00* (2006.01)
  *F28F 25/10* (2006.01)
  *H02K 7/14* (2006.01)
  *F28F 25/06* (2006.01)
  *H02K 5/10* (2006.01)
  *F28F 25/00* (2006.01)

(52) U.S. Cl.
  CPC ............. *H02K 1/32* (2013.01); *H02K 5/10* (2013.01); *H02K 7/14* (2013.01); *H02K 9/02* (2013.01); *H02K 9/22* (2013.01); *F28C 2001/006* (2013.01); *F28F 2025/005* (2013.01); *F28F 2250/08* (2013.01)

(58) Field of Classification Search
  CPC ......... F28F 2250/08; H02K 1/32; H02K 5/10; H02K 7/14; H02K 9/02; H02K 9/06; H02K 9/22
  USPC ............................................. 261/30, DIG. 11
  See application file for complete search history.

(56) References Cited

U.S. PATENT DOCUMENTS

| | | | |
|---|---|---|---|
| 2,092,249 A | | 9/1937 | Gymnaites |
| 2,218,198 A | * | 10/1940 | Harris ................ F24F 6/06 239/214.21 |
| 3,083,312 A | | 3/1963 | Moore |
| 3,768,546 A | | 10/1973 | Shipes |
| 3,830,587 A | * | 8/1974 | Shipes ............ F04D 19/007 138/39 |
| 3,840,067 A | | 10/1974 | Bos |
| 4,217,317 A | * | 8/1980 | Neu .................. F28B 1/06 261/160 |
| 4,443,389 A | * | 4/1984 | Dodds ................ F28B 1/06 138/38 |
| 5,755,557 A | | 5/1998 | Alizadeh |
| 8,104,746 B2 | * | 1/2012 | Wiltz ................ F28C 1/02 261/23.1 |
| 2014/0130535 A1 | | 5/2014 | Santoro |
| 2014/0131016 A1 | * | 5/2014 | Santoro ............ F04D 19/024 165/121 |

\* cited by examiner

Radial Fins

Round Holes

Longitudinal Fins

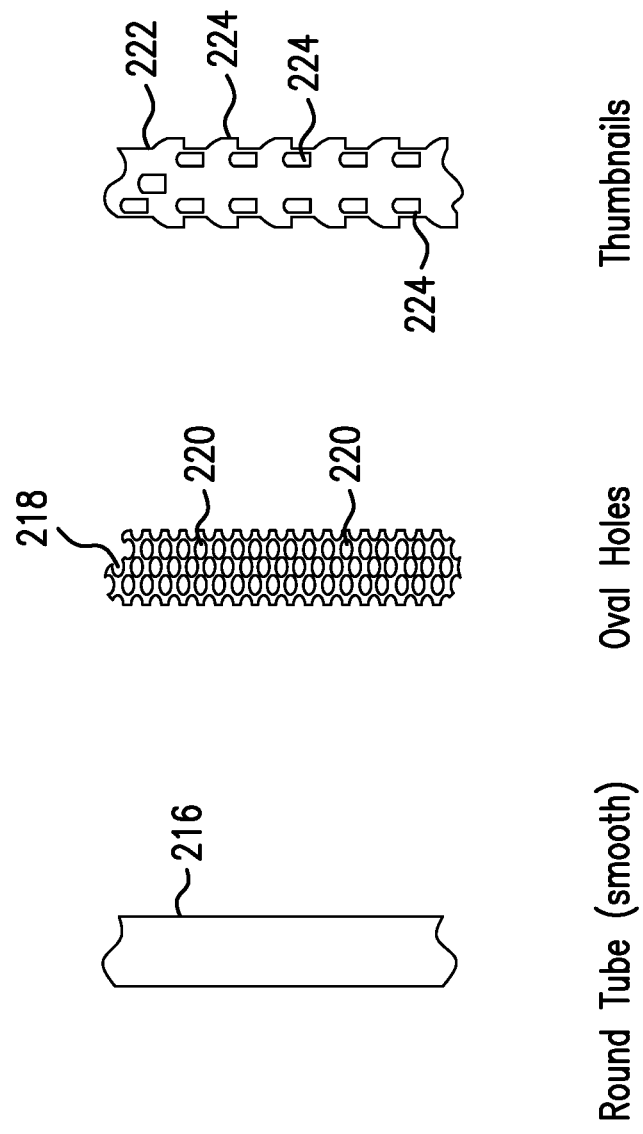
FIG. 7D Round Tube (smooth)
FIG. 7E Oval Holes
FIG. 7F Thumbnails

COOLING SCHEMES AND METHODS FOR COOLING TOWER MOTORS

CROSS-REFERENCE TO RELATED APPLICATIONS

This application claims the benefit of and priority to U.S. application No. 62/027,100, filed Jul. 21, 2014 and to U.S. application No. 62/049,105, filed Sep. 11, 2014. The entire disclosures of the aforesaid U.S. application Nos. 62/027,100 and 62/049,105 are hereby incorporated by reference.

TECHNICAL FIELD

The present invention is directed to various schemes and configurations for cooling electric machines having a stator and rotor that that produce flux, such as electric motors.

BACKGROUND ART

During operation of electric machines having a stator and a rotor, such as motors, excessive heat may be generated in the stator windings or in other portions of the electric machine. In order to prevent such excessive heat from damaging the electric machine, reducing its performance or shortening its operational life, it is necessary to cool the motor so as to reduce or remove the heat. The aforementioned problem with excessive heat is a significant problem in motors used in cooling towers or air-cooled heat exchangers.

DISCLOSURE OF THE INVENTION

The present invention provides techniques, schemes configurations and methods for removing or reducing heat in electrical machines having a stator and rotor that cooperate to produce flux. In particular, the present invention provides techniques, schemes configurations and methods for removing or reducing heat in motors that are used in cooling towers or air-cooled heat exchanger towers.

In one embodiment, the present invention is directed to a cooling tower comprising a cooling tower structure and a motor supported by the cooling tower structure. The motor comprises a motor casing and a rotatable shaft. The cooling tower further comprises a cooling tower fan that comprises a fan hub, a plurality of fan blades attached to the rotatable shaft and a supplemental fan attached to the fan hub such that the supplemental fan is between the fan hub and the motor. Rotation of the cooling tower fan causes rotation of the supplemental fan which increases airflow around the casing of the motor so as to facilitate cooling of the motor.

Other embodiments of configurations, schemes, method and techniques for thermally managing motors are described herein in detail.

BRIEF DESCRIPTION OF THE DRAWINGS

FIGS. 7A-F are partial, elevational views of various cooling tubes used in the motors of the present invention

BEST MODE FOR CARRYING OUT THE INVENTION

It is well known in the industry that motors have "housings" or "casings" that contain the internal components in the motor, such as the stator and rotor. As used herein, the terms "casing" or "motor casing", "housing" or "motor housing" all have the same meaning and are used interchangeably.

Although the ensuing description is in terms of the embodiments of the present invention being used in a cooling tower or air-cooled heat exchanger, it is to be understood that the ensuing embodiments of the present invention may be applied to motors used in applications other than cooling towers or air-cooled heat exchangers.

Wet cooling towers are described in U.S. Pat. No. 8,111,028 entitled "Integrated Fan Drive System For Cooling Tower" and international application no. PCT/US2012/061244 entitled "Direct Drive Fan System With Variable Process Control" and published under International Publication No. WO 2013/059764. The entire disclosure of U.S. Pat. No. 8,111,028 is hereby incorporated by reference. The entire disclosure of international application no. PCT/US2012/061244 is hereby incorporated by reference. Dry cooling towers are described in U.S. Pat. No. 8,188,698 entitled "Integrated Fan Drive System For Air-Cooled Heat Exchanger (ACHE)". The entire disclosure of U.S. Pat. No. 8,188,698 is hereby incorporated by reference.

The present invention is directed to various methods, techniques, configurations and schemes for cooling motors and to corresponding motor configurations. In accordance with the invention, various cooling mediums are used to cool the motors. Such cooling mediums include clean, dry, filtered air and water, or a combination of clean, dry, filtered air and water, or a combination of clean, dry, filtered air and water mixed with additives such as glycol, ammonia or Freon. Another cooling medium used is chilled air which may be compressed. In other embodiments, a gas or combination of gases are used instead of air.

Although the ensuing description is in terms of the embodiments of the invention being applied to wet cooling towers, it is to be understood that embodiments of the invention may be applied to dry cooling towers or ACHE units as disclosed in the aforementioned U.S. Pat. No. 8,188,698. It is also to be understood the embodiments of the invention may be applied to a motor regardless of it orientation (e.g. upside down, right side up, angular orientation, horizontal, etc.). Thus, the techniques, schemes, configurations and methods of the present invention may be applied to a motor regardless of the orientation of its shaft.

Figure 1:
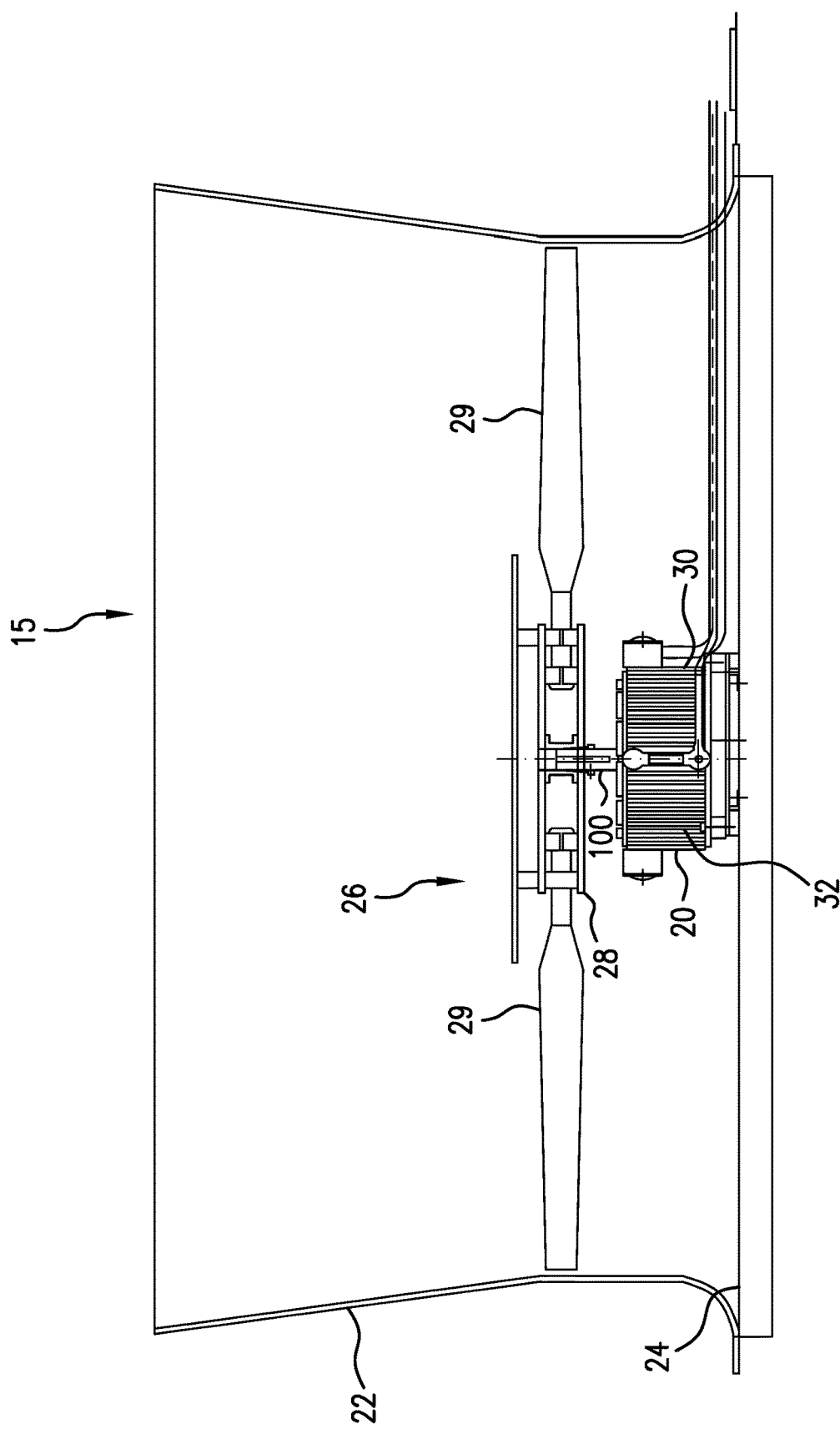
FIG. 1 is a diagram of a portion of a wet cooling tower.

Referring to FIG. 1, there is shown a basic block diagram of cooling tower 15 that utilizes motor 20 of the present invention. Cooling tower 15 includes fan stack 22, fan deck 24 and fan 26. Fan stack 22 is connected to fan deck 24. Fan 26 has fan hub 28 and fan blades 29 that are connected to fan hub 28. Motor 20 has rotatable shaft 100 that directly drives fan 26. Fan 26 rotates within fan stack 22. Motor 20 includes casing 30 which has exterior surface 32. The height of motor 20 must be in a predetermined range in order to maintain the height of fan 26 in fan stack 22 for sealing and fan performance. Motor 20 is relatively large in diameter in order to produce a significant torque to cause rotation of fan 26. Cooling tower 20 is a "wet cooling tower" which uses the latent heat of evaporation to cool process fluids. "Process fluids" are fluids that are used in a process, e.g. cracking crude, chemical processing, etc. Since motor 20 is directly driving the fan, the air-flow around motor 20 is relatively low.

The air-flow around motor 20 is dictated by the diameter of the fan hub, fan blades and fan speed. It has been found that making the fan hub diameter smaller and extending the fan blade to the smaller diameter fan hub increases the air flow around the motor.

Figure 2:
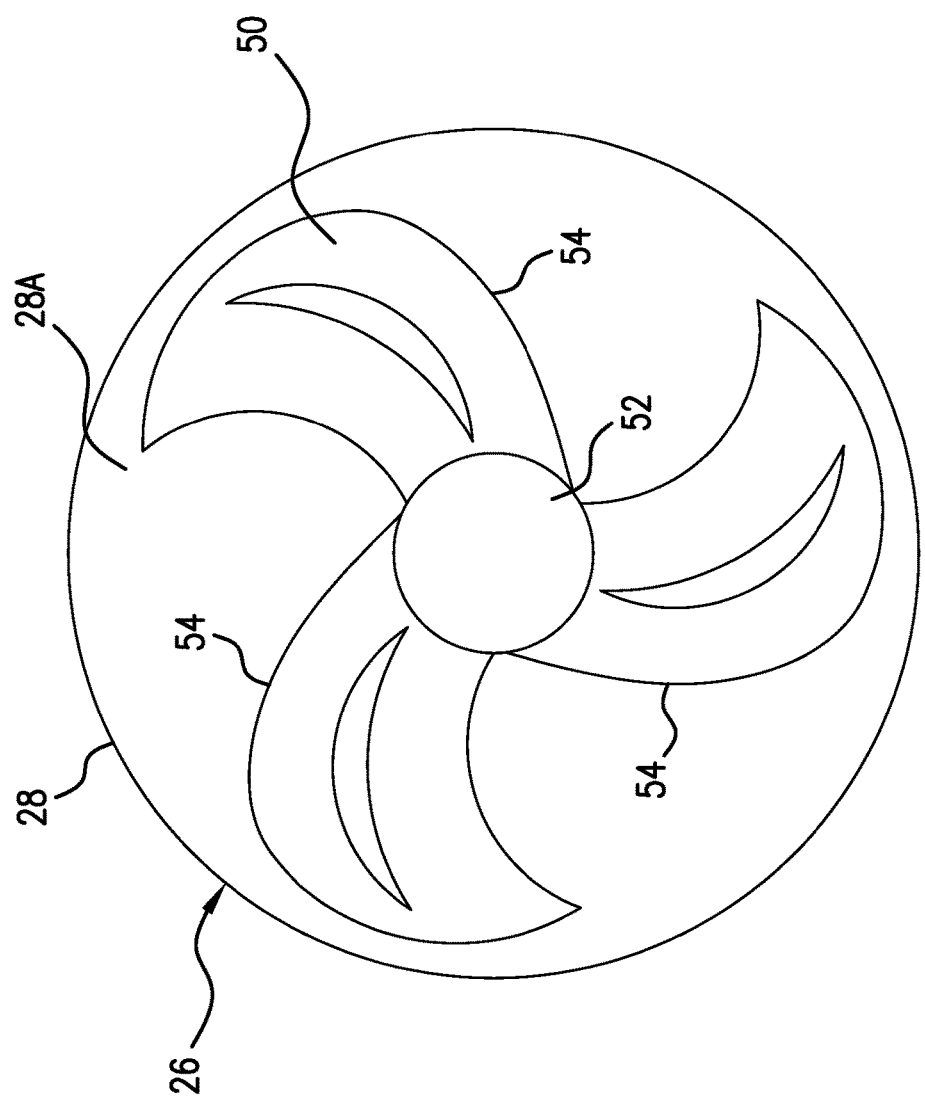
FIG. 2 is a bottom view of a cooling tower fan having a supplemental fan in accordance with one embodiment of the invention.

Referring to FIG. 2, in order to increase the air-flow around motor 20, supplemental fan 50 is connected to the bottom side 28A of fan hub 28. Fan 50 comprises hub 52 and blades 54 that are attached to hub 52. In order to simplify the view of FIG. 2, fan blades 29 are not shown in FIG. 2. The function of fan 50 is to draw more airflow around motor 20 wherein the increased air-flow can be used to cool motor 20. Although fan 26 is a multi-piece fan, it is to be understood the fan 50 can be connected to a one-piece fan as well as relatively smaller fans such as the BAC Whisper Quiet Fan. The particular type, design, size and weight of fan 50 depends upon the type of installation required, fan speed, the required air flow for the motor and whether the motor is a single speed or variable speed motor.

Figure 3:
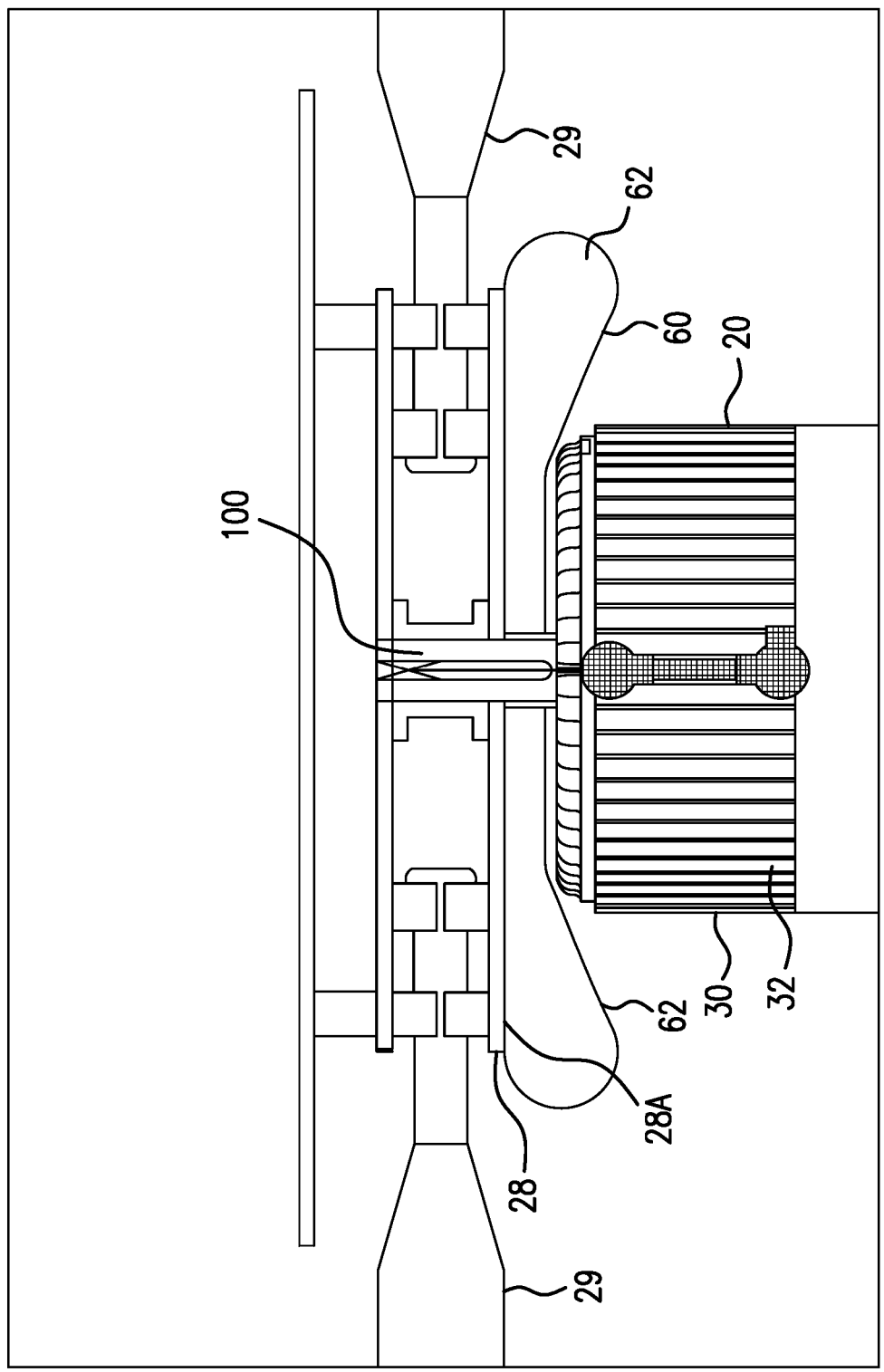
FIG. 3 is a side view of the cooling tower fan having a supplemental fan in accordance with another embodiment of the invention, the view showing only a portion of the cooling tower fan in order to emphasize the supplemental fan.

Referring to FIG. 3, there is shown another embodiment of the invention. Supplemental fan 60 is attached or connected to the bottom 28A of fan hub 28. Fan 60 comprises fan blades 62. In one embodiment, supplemental fan 60 is a separate component that is connected or attached to fan hub 28. In another embodiment, fan 60 is integral with fan 28. In other embodiments, fan 60 may be connected to a one-piece fan as well as to smaller fans such as the BAC Whisper Quiet Fan. In another embodiment, fan 60 is configured to have a variable pitch apparatus to provide various fan pitch to fan 60 for various air-flows.

Figure 4A:
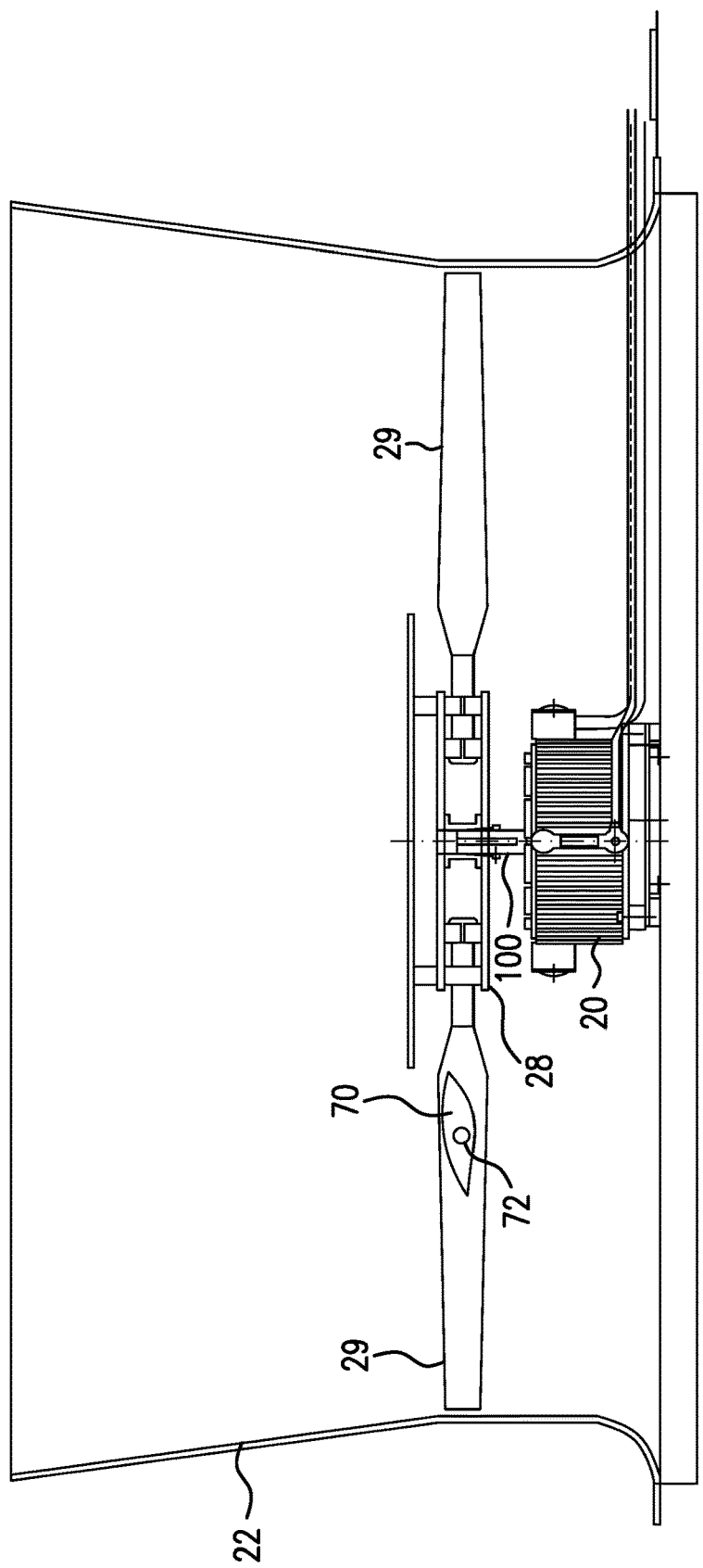
FIG. 4A is a side view of the cooling tower fan having a supplemental fan in accordance with another embodiment of the invention

Referring to FIG. 4A, there is shown another embodiment of the present invention. Supplemental wide chord fan blade 70 is attached or connected to fan blade 29 (see FIG. 1) in order to increase air-flow to motor 20. Adjustable pitch device 72 is either a separate component that is attached fan blade 29 or is integrally formed with fan blade 29. Adjustable pitch device 72 allows for adjustment of the pitch of supplemental wide chord fan blade 70. It is to be understood that a supplemental wide chord fan blade 70 can be attached to each fan blade 29.

Figure 4B:
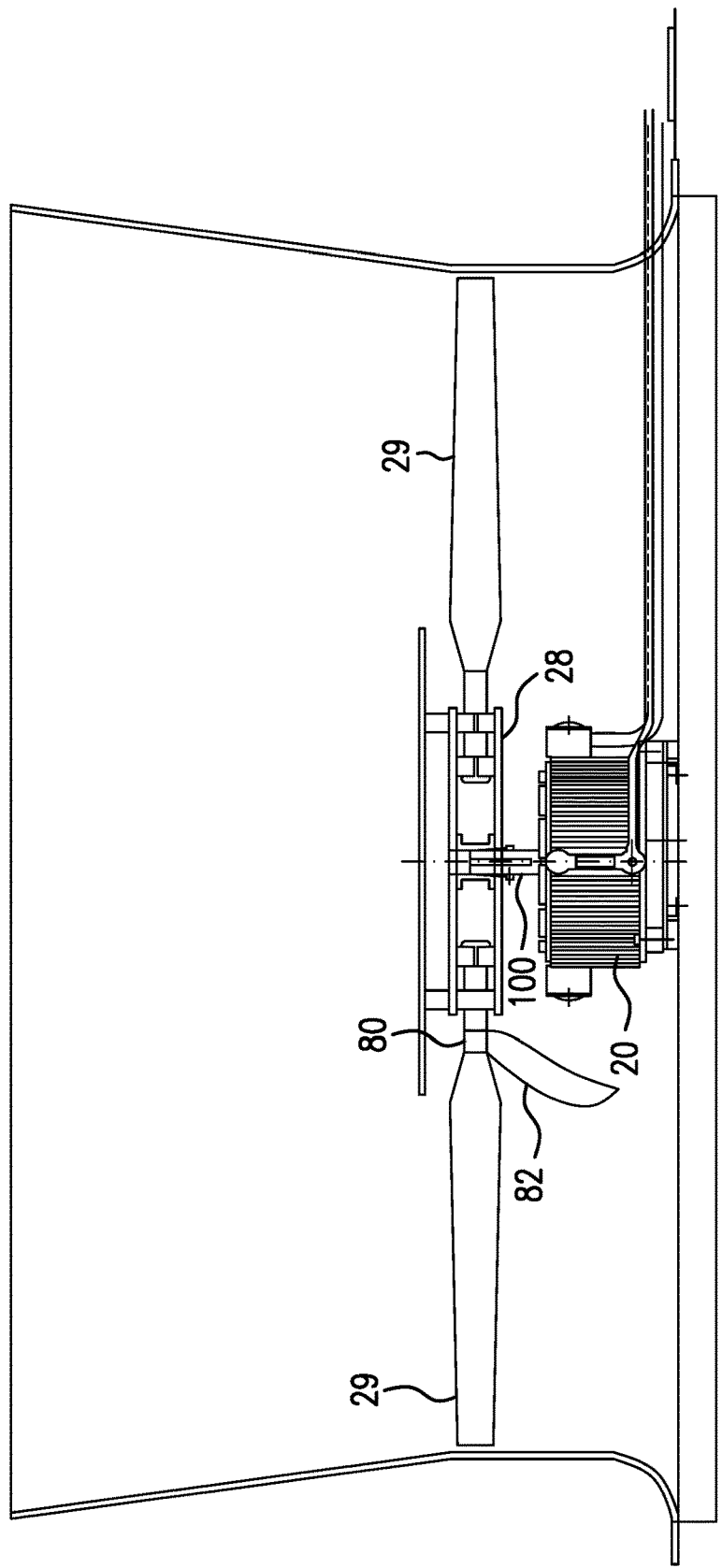
FIG. 4B is a side view of the cooling tower fan having a supplemental fan in accordance with another embodiment of the invention.

Referring to FIG. 4B, there is shown another embodiment of the present invention. Fan pitch adjustment device 80 is attached to the neck of fan blade 29 and supplemental wide chord fan blade 82 is connected to pitch adjustment device 80. Pitch adjustment device 80 allows for the adjustment of the pitch of supplemental wide chord fan blade 82. It is to be understood that a supplemental wide chord fan blade 82 can be attached to each fan blade 29.

Figure 4C:
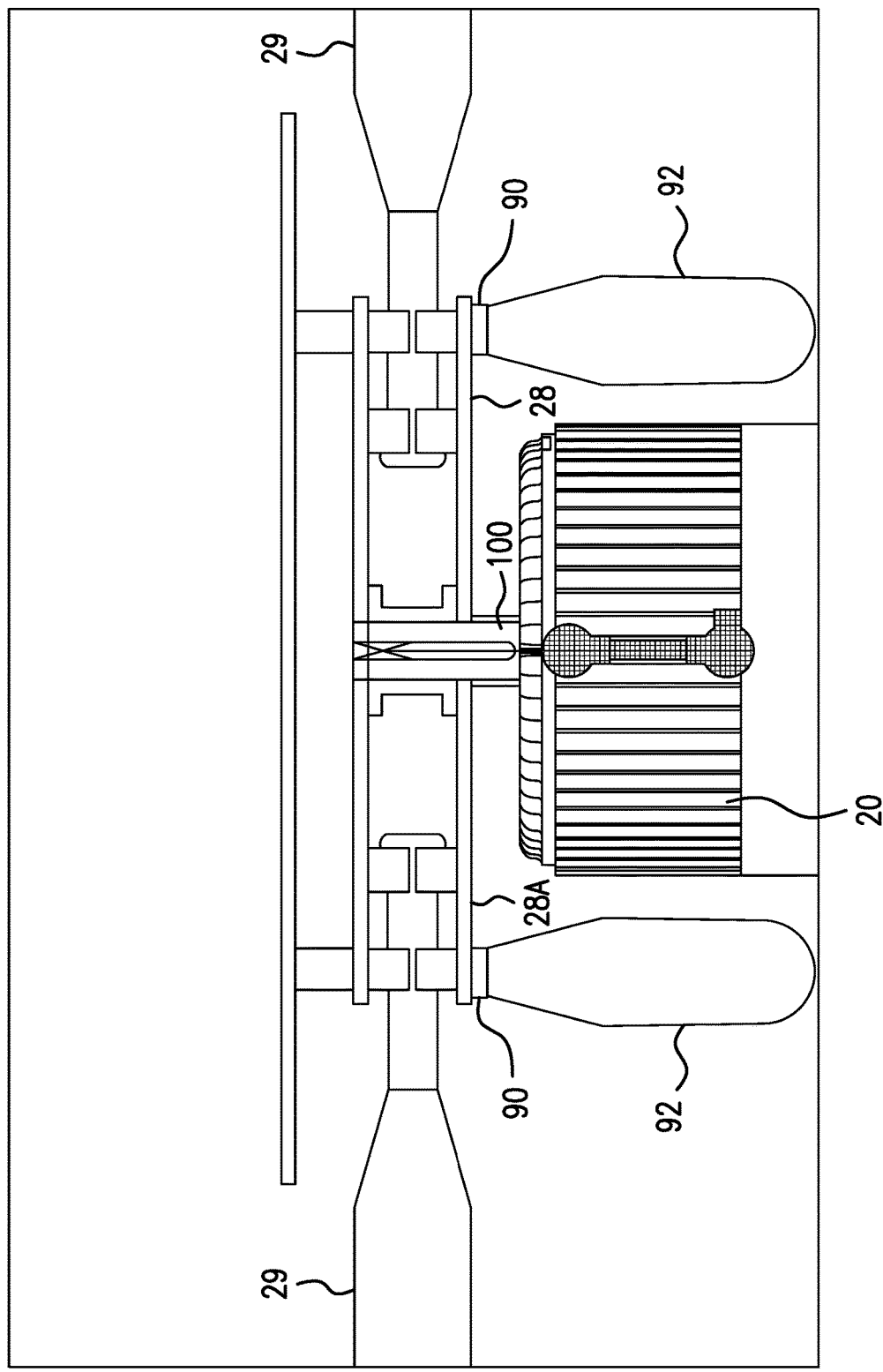
FIG. 4C is a side view of the cooling tower fan having a supplemental fan in accordance with another embodiment of the invention, the view showing only a portion of the cooling tower fan in order to emphasize the supplemental fan.

Referring to FIG. 4C, there is shown another embodiment of the present invention. In this embodiment, adjustable fan pitch devices 90 are either integral with fan hub 28 or are separate components that are attached to bottom side 28A of fan hub 28. A supplemental fan blade 92 is attached to each adjustable fan pitch device 90.

Figure 5B:
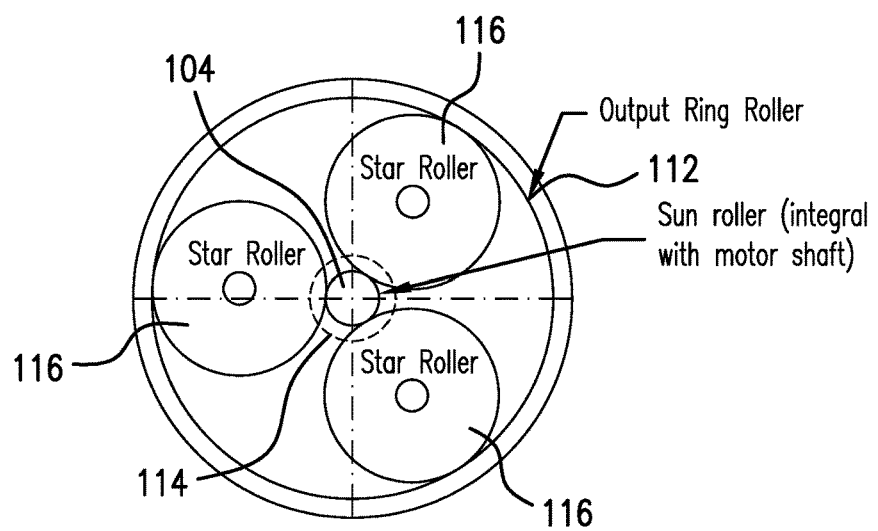
FIG. 5B is plan view of the elliptical traction drive device shown in FIG. 5A.
Figure 5A:
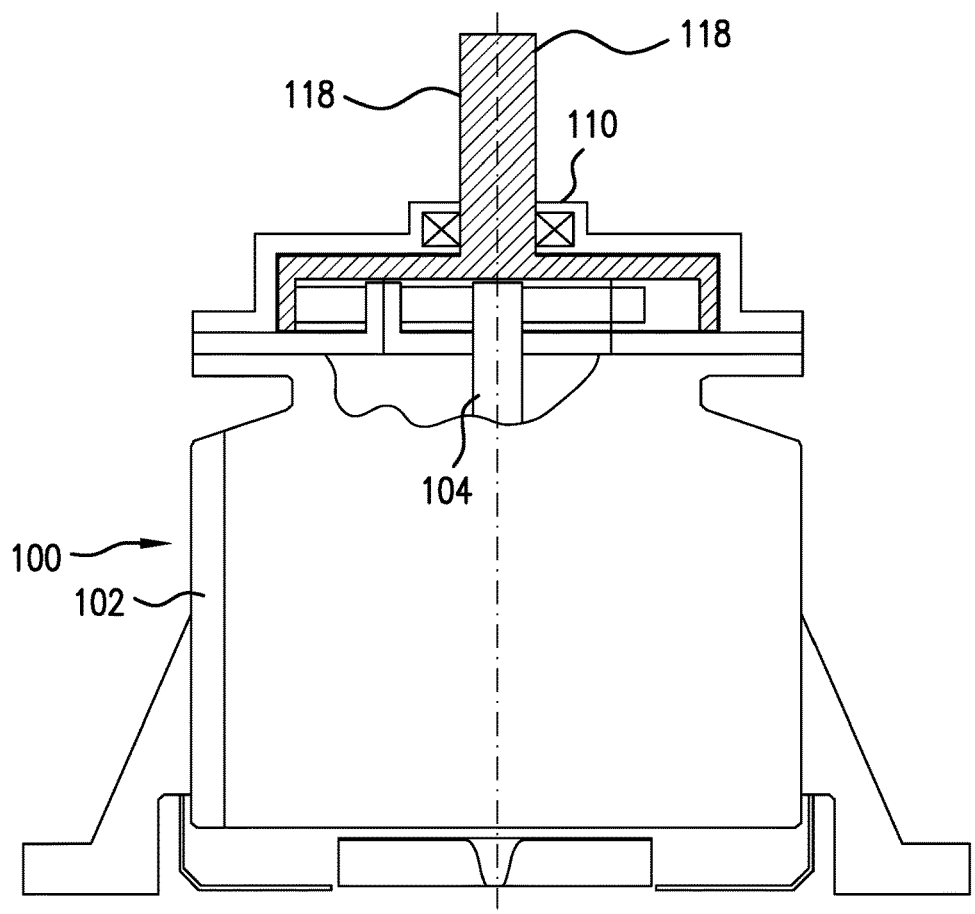
FIG. 5A is a side elevational view, partially in cross-section, of a Totally Enclosed Fan Cooled Motor having an elliptical traction drive device.
Figure 6:
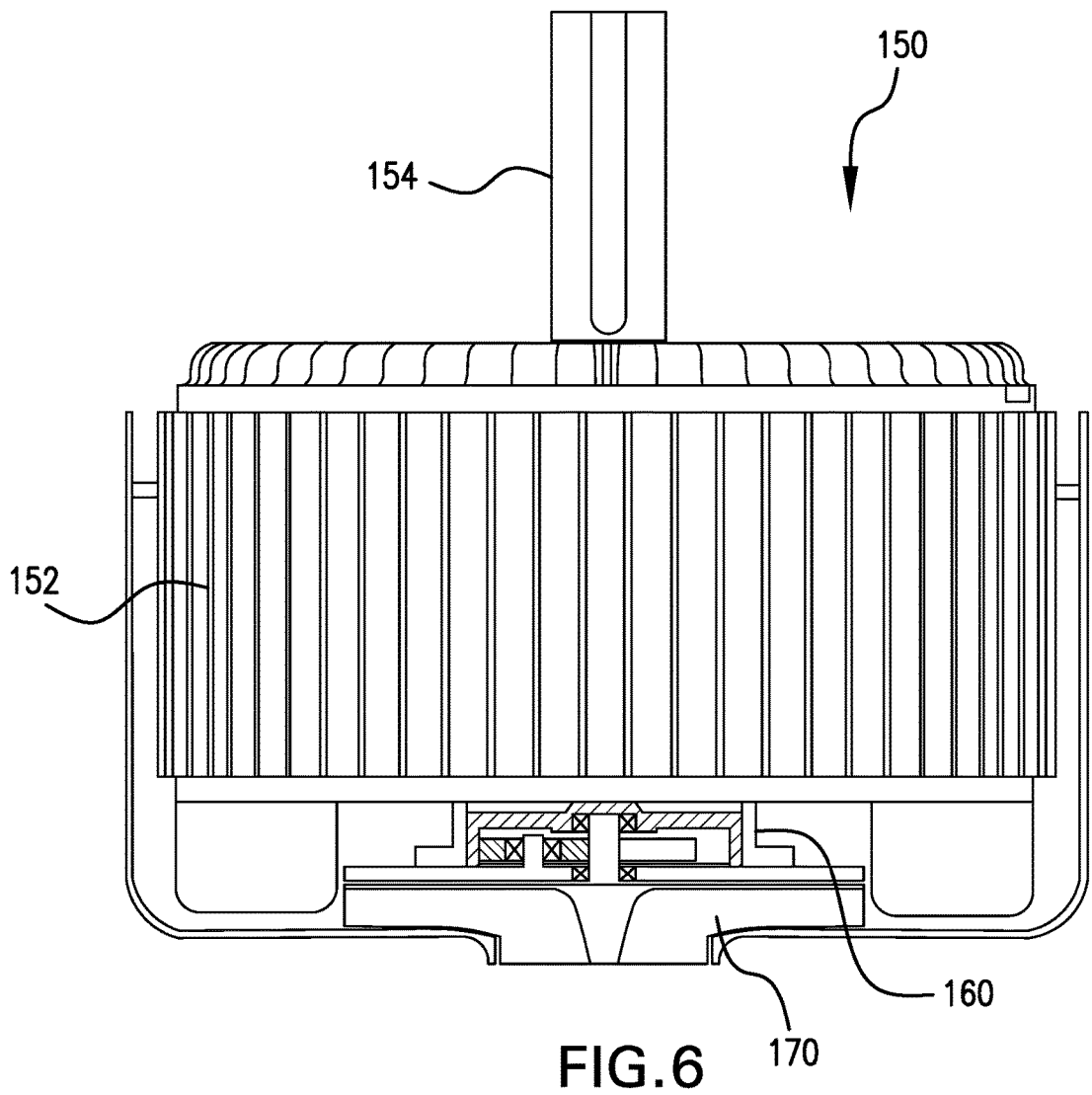
FIG. 6 is a side elevational view, partially in cross-section, of a Totally Enclosed Fan Cooled Motor having an elliptical traction drive device in accordance with another embodiment of the invention.

Some motors, due to their design, rotate the cooling fan too slow for the cooling fan to produce an appreciable cooling flow. For example, fan speeds below 200 RPM may not generate any appreciable air-flow around the motor. In order to solve this problem, the motor 100, shown in FIGS. 5A, 5B and 6, is presented. Totally Enclosed Fan Cooled (TEFC) motor 100 comprises casing 102, shaft 104 and a stator and rotor (not shown). In order to increase fan speed, motor 100 comprises an Elliptical Traction Drive (ETD) device 110. Elliptical Traction Drive device 110 comprises output ring roller 112, sun roller 114 and star rollers 116. ETD device 110 includes shaft 118 that is connected to the cooling tower fan. Sun roller 114 is integral with motor shaft 104. ETD 110 can step up or step down the fan speed as required for cooling with respect to fan design. Such an ETD device 110 is described in international application no. PCT/US2014/014408, entitled "Direct-Drive System For Cooling System Fans, Exhaust Blowers And Pumps", published under international publication no. WO 2014/123804, and is therefore not described in detail herein. The entire disclosure of international application no. PCT/US2014/014408 is hereby incorporated by reference. Thus, motor 100 can replace motor 20 shown in FIG. 1. Furthermore, motor 100 can be used with fan 26 as modified with any of supplemental fans shown in FIGS. 2, 3 and 4A-C.

Referring to FIG. 6, there is shown an alternate TEFC motor 150 in accordance with another embodiment of the invention. Motor 150 includes casing 152, rotational shaft 154 and ETD device 160. ETD device 160 is located at the bottom of motor 150. Supplemental axial fan 170 is mounted to ETD device 160 with a modified mounting arrangement and without the enclosure. Supplemental axial fan 170 provides additional cooling of motor 150.

Figure 7C:
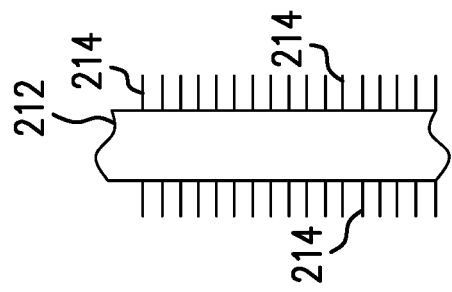
Figure 7B:
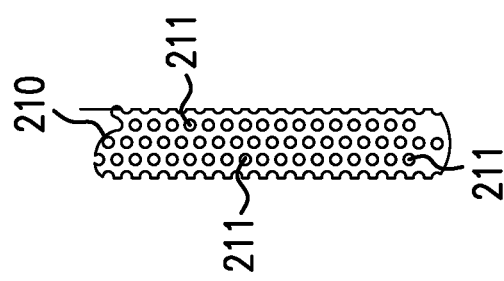
Figure 7A:
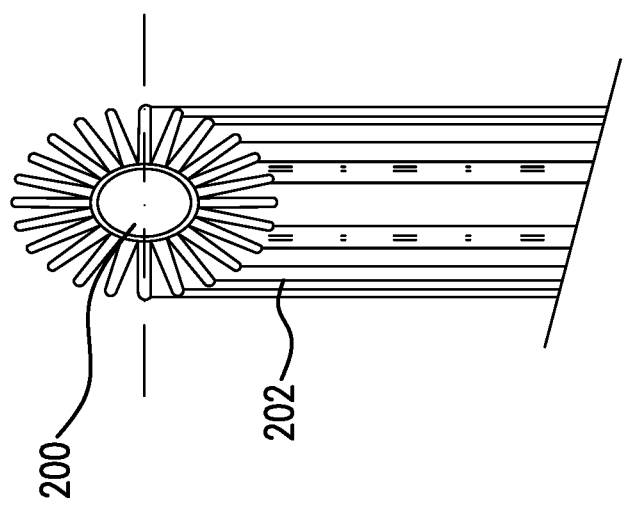

In another aspect of the invention, a motor may be configured to include cooling tubes having particular configurations such as cooling fins, radial fins, oval holes, round holes, round tubes, and thumbnails in order to effect cooling of the motor. Such cooling tube configurations are shown in FIGS. 7A-F. FIG. 7A shows cooling tube 200 having longitudinal fins 202. In a preferred embodiment, cooling tube 200 is a continuous tube. Cooling tube 200 can transfer air and/or water from one location in the motor to another location in the motor without leakage and exchange heat between the motor and the media in cooling tube 200. FIG. 7C shows cooling tube 212 having radial fins 214. In a preferred embodiment, cooling tube 212 is a continuous tube. The cooling tube 212 transfers air and/or water from one location in the motor to another location in the motor. Cooling tube 212 exchanges heat between the motor and the media in cooling tube 212. FIG. 7D shows round cooling tube 216 having a smooth configuration. In a preferred embodiment, cooling tube 216 is a continuous tube with a smooth surface. The cooling tube 216 transfers air and/or water from one location in the motor to another location in the motor without leakage and exchanges heat between the motor and the media in cooing tube 216. FIG. 7B shows cooling tube 210 that has round holes 211. FIG. 7E shows cooling tube 218 having oval holes 220. FIG. 7F shows a cooling tube 222 that is configured with thumbnails 224. In preferred embodiments, cooling tubes 210, 218 and 222 are continuous tubes that transfer air and/or water from one location in the motor to another location in the motor without leakage and exchanges heat between the motor and the media in the cooling tube.

In alternate embodiments, the cooling tubes shown in FIGS. 7A-F may be modified to have other cross-sectional shapes.

In another embodiment, air from the cooling tubes is forced through round and/or oval holes and/or thumbnails into the motor cavity imparting swirl and turbulence that facilitates mixing of hot and cold air to improve heat transfer.

Figure 8B:
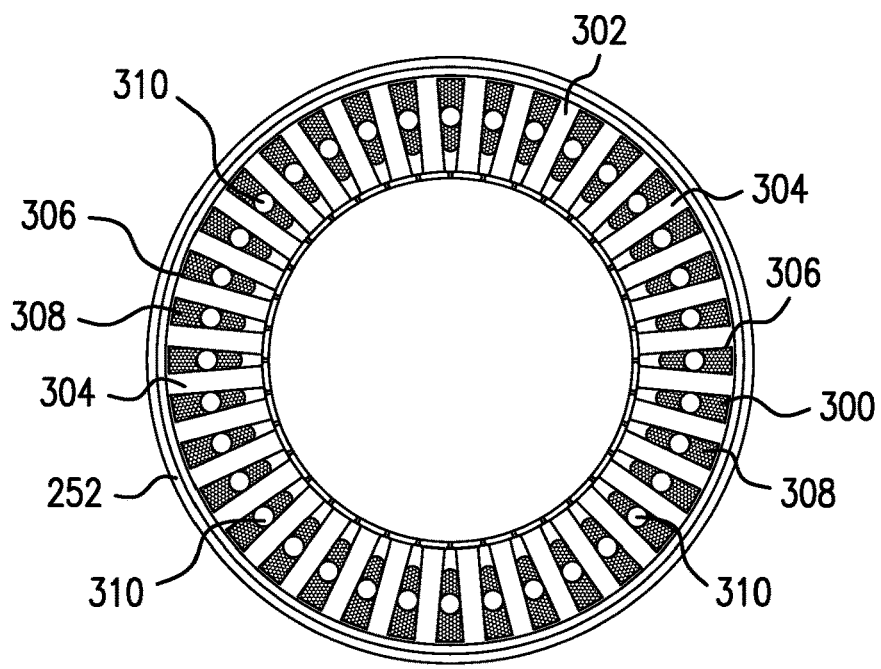
FIG. 8B is a plan view of the stator of the motor of FIG. 8A, the view not showing other motor components in order to simplify the view of the stator.
Figure 8A:
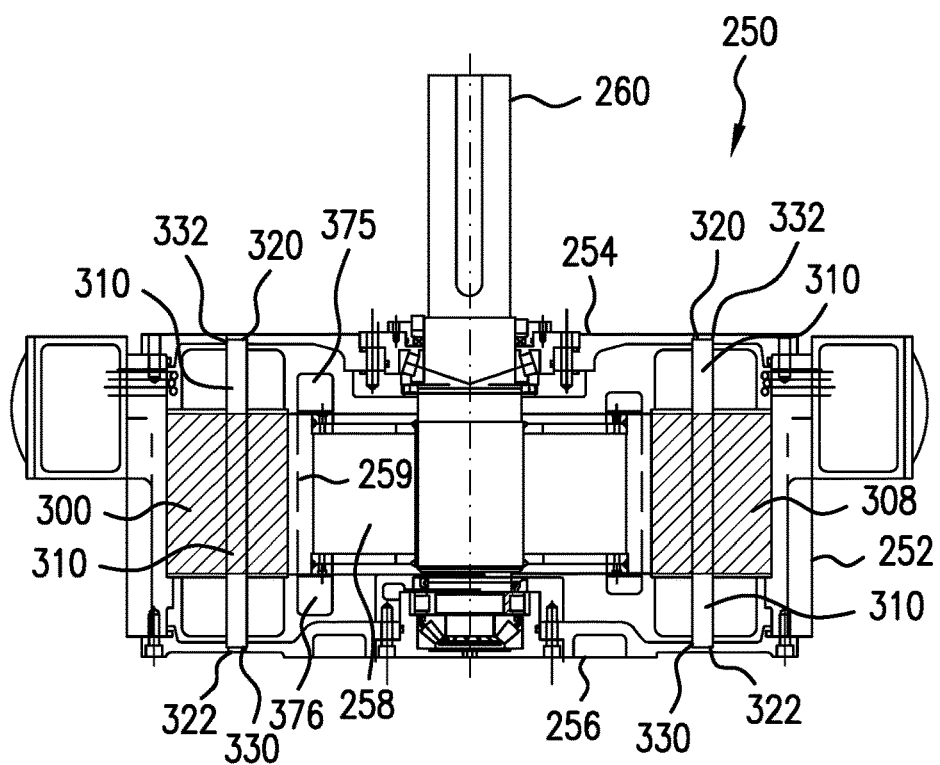
FIG. 8A is a diagram of a motor using a passive air-cooling scheme in accordance with one embodiment of the invention.

Referring to FIGS. 8A and 8B, there is shown motor 250 that incorporates a passive air-cooling scheme in accordance with one embodiment of the present invention. Motor 250 comprises casing 252, top cover 254, bottom cover 256, rotor 258, rotatable shaft 260 and stator 300. Rotor 258 includes a plurality of permanent magnets 259. Stator 300 comprises a plurality of lamination sheets 302 that are attached or bonded together to form stack 304. Each lamination sheet 302 has a plurality of slots 306 through which windings or coils 308 are wound. During operation of motor 250, significant heat is produced in windings 308. In accordance with this embodiment of the invention, round, continuous cooling tubes 310 are inserted into the windings or coils 308 in order to directly cool windings 308 and facilitate transfer of heat from windings 308 to the outside environment. Cooling tube 310 has the same configuration as cooling tube 216 shown in FIG. 7D. Cooling tubes 310 are sealed at top cover 254 with O-ring 320 and at bottom cover 256 with O-ring 322. O-ring 320 prevents moisture or contaminants enter motor 250 at the junction of tubes 310 and top cover 254. Similarly, O-ring 322 prevents moisture or contaminants from entering motor 250 at the junction of tubes 310 and bottom cover 256. O-rings 320 and 322 allow for thermal expansion of motor 250 and maintain sealing integrity. Each tube 310 has bottom opening 330 that is in communication with a corresponding opening in bottom cover 256. Each tube 310 also has a top opening 332 in communication with a corresponding opening in top cover 254. Cooling air flows into bottom opening 330 and flows through the tube 310 and is ejected from top opening 332 into the fan air stream. This cooling embodiment takes advantage of the available upward moving air under and around motor 250 created by rotation of the direct-drive cooling tower fan or supplemental fan. For a wet cooling tower, the 100% humid air facilitates removal of heat from windings 308. In one embodiment, cooling tubes 310 are fabricated from copper. In one embodiment, cooling tubes 310 are insulated with Teflon, Silicone or an equivalent material for windings 308. Teflon offers the advantage of temperature compatibility with the benefit of suitable electrical insulating properties. Silicone offers excellent thermal conductivity combined with excellent electrical insulating properties. If cooling tubes 310 are made from copper and/or other electrically conductive materials, then the cooling tubes 310 will have to be electrically insulated. However, if windings 308 have been through a Vacuum Pressure Impregnated (VPI) Process, the additional electrical insulation may not be necessary. Cooling tubes 310 may be manufactured from other materials that are thermally conductive and electrically insulative such as Teflon, silicone and high temperature plastics. In an alternate embodiment, a cooling tube 310 is embedded in every other winding 308.

Rotor 258 includes fan structure 375 that is attached to or integral with the top end of rotor 258 and fan structure 376 that is attached to or integral with the bottom end of rotor 258. Fan structures 375 and 376 have the same structure, function and purpose as fan structures 850 and 852, respectively, that are shown in FIG. 13A and described herein.

Cooling tubes are best used at the source of the generated heat source such as the coil, but are not limited to those locations. It is to be understood that the cooling tube route may be varied as required by application and is not limited to configuration wherein the cooling tubes extend between the top and bottom covers of the motor casing.

Figure 9B:
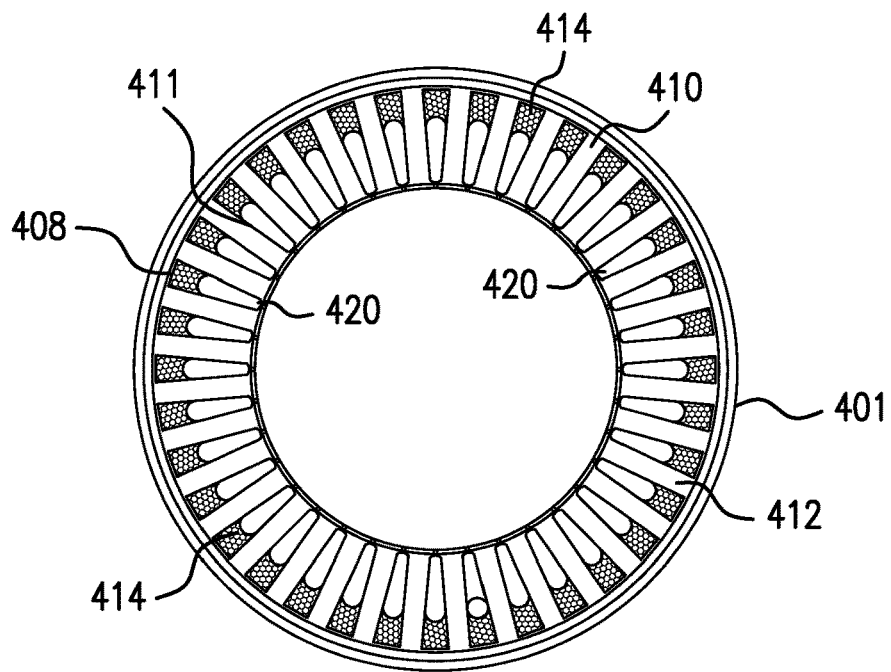
FIG. 9B is a plan view of the stator of the motor of FIG. 9A, the view not showing other motor components in order to simplify the view of the stator
Figure 9A:
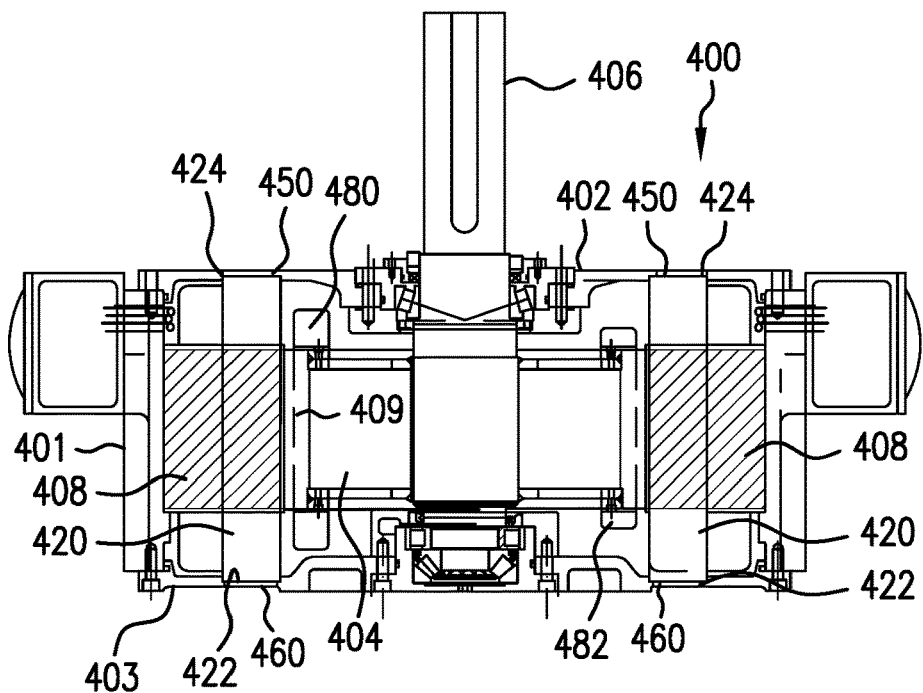
FIG. 9A is a diagram of a motor using a passive air-cooling scheme in accordance with one embodiment of the invention.

Referring to FIGS. 9A and 9B, there is shown motor 400 which incorporates a passive air-scheme in accordance with another embodiment of the invention. Motor 400 comprises casing 401, top cover 402, bottom cover 403, rotor 404, rotatable shaft 406 and stator 408. Rotor 404 includes a plurality of permanent magnets 409 as is well known in the art. Stator 408 comprises a plurality of lamination sheets 410 that are attached or bonded together to form stack 412. Each lamination sheet 410 has a plurality of slots 411 (similar to 306 in FIG. 8A) through which windings or coils 414 are wound. During operation of the motor, significant heat is produced in windings 414. In this embodiment, stator 408 does not use round cooling tubes. Instead, continuous ducts 420 are embedded in stator 408 as windings 414 are inserted into the stator stack 412 during production of stator stack 412. Each duct 420 may have a unique shape other than circular. Each duct 420 has a bottom opening 422 that is in communication with a corresponding opening in bottom cover 403. Each duct 420 also has a top opening 424 in communication with a corresponding opening in top cover 402. Cooling air flows into bottom opening 422 of each duct 420 and flows through the ducts 420 and is ejected from top opening 424 into the fan air stream. This passive cooling air-cooling embodiment is suited for use in relative large-diameter direct-drive cooling tower motors, such as motor 400, since such motors are configured with a "pancake motor arrangement" wherein the motor is relatively short in height as required by installation purposes. Motor 400 has relatively large deep slot laminations 410 that make up stator 408 thereby allowing for extra room for ducts 420 to pass air to cool coils windings 414. When combined with deep slot laminations, the shaped ducts 420 can be installed between the inserted windings 414, which are near casing 401, and rotor 404 thereby providing an insulating barrier of air that prevents or minimizes the transfer of heat from the windings to the magnets that are on rotor 404. O-rings 450 seal the junction of ducts 420 and top cover 402 and O-rings 460 seal the junction of ducts 420 and bottom cover 403 in the same manner in which cooling tubes 310 are sealed to top cover 254 and bottom cover 256 (see FIGS. 8A and 8B).

Rotor 404 comprises fan structure 480 that is attached to or integral with the top end of rotor 404 and fan structure 482 that is attached to the bottom end of rotor 404. Fan structures 480 and 482 have the same structure, function and purpose as fan structures 850 and 852, respectively, that are shown in FIG. 13A and described herein.

Figure 10B:
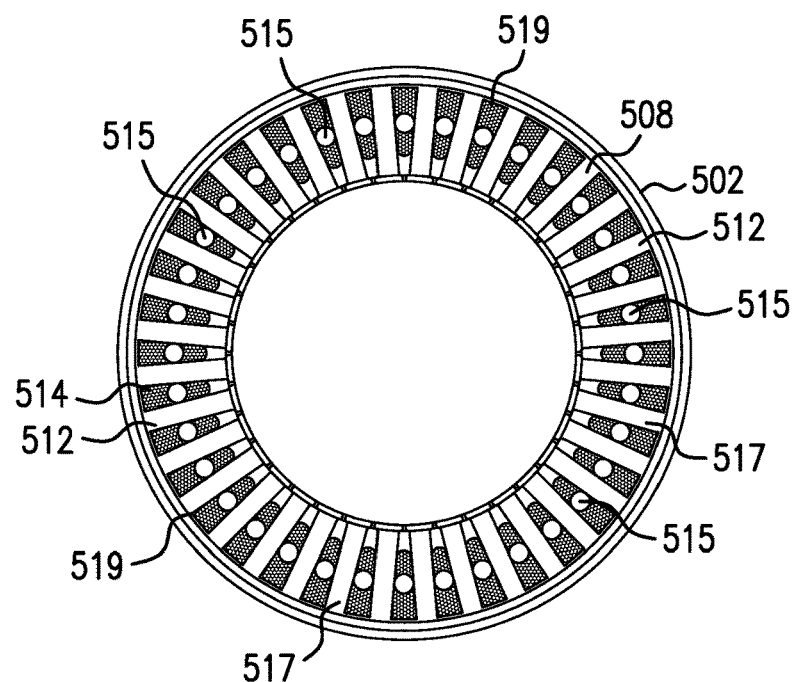
FIG. 10B is a plan view of the stator of the motor of FIG. 10A, the view not showing other motor components in order to simplify the view of the stator.
Figure 10A:
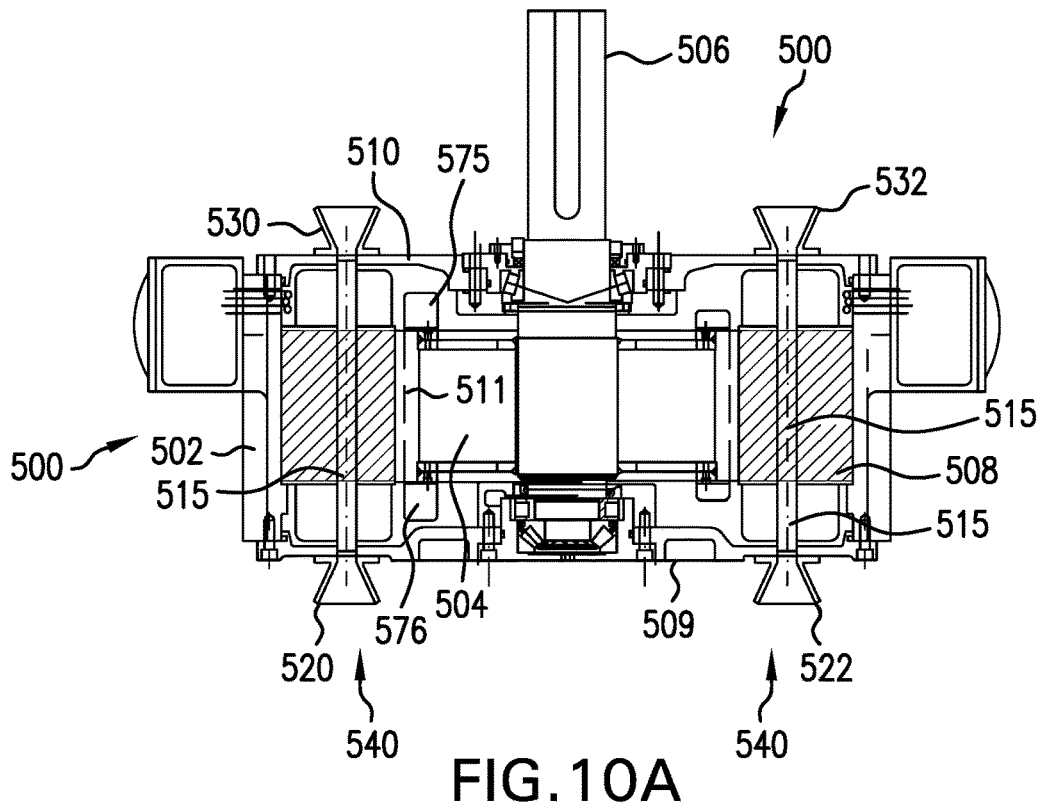
FIG. 10A is a diagram of a motor using a passive air-cooling scheme in accordance with one embodiment of the invention.

Referring to FIGS. 10A and 10B, there is shown motor 500 which uses an alternate passive air-cooling scheme in accordance with another embodiment. In this embodiment, motor 500 comprises casing 502, rotor 504, rotatable shaft 506, stator 508 bottom cover 509 and top cover 510. Rotor 504 has a plurality of magnets 511 attached thereto as is well known in the art. Stator 508 comprises a plurality of lamination sheets 517 that are attached or bonded together to form stator stack 512. Each lamination sheet 517 has a plurality of slots 519 through which windings or coils 514 are wound. Stator 508 is configured exactly the same as stator 300 in (see FIGS. 8A and 8B) and uses cooling tubes 515. Cooling tubes 515 have the same shape, configuration and functions as cooling tubes 310. Motor 500 includes inlet ducts 520 and 522 that are mounted or attached to bottom cover 509. Motor 500 further includes exhaust nozzles 530 and 532 that are mounted or attached to top cover 510. Inlet ducts 520, 522 and output nozzles 530, 532 are in communication with cooling tubes 515. Air-flow, indicated by reference number 540, flows into inlet ducts 520 and 522 and through cooling tubes 515 and then out through exhaust nozzles 530 and 532. Inlet ducts 520, 522 and output nozzles 530, 532 enhance the flow of air into cooling tubes 515. Inlet ducts 520 and 522 direct more available air (and water) into cooling tubes 515 and out through exhaust nozzles 530 and 532 so as to facilitate acceleration of air back into the fan airstream through controlled expansion. As a result of this configuration, mass airflow through cooling tubes 515 is improved thereby increasing heat transfer.

Rotor 504 comprises fan structure 575 that is attached to or integral with the top end of rotor 504 and fan structure 576 that is attached to or integral with the bottom end of rotor 504. Fan structures 575 and 576 have the same structure, function and purpose as fan structures 850 and 852, respectively, that are shown in FIG. 13A and described herein.

Figure 11:
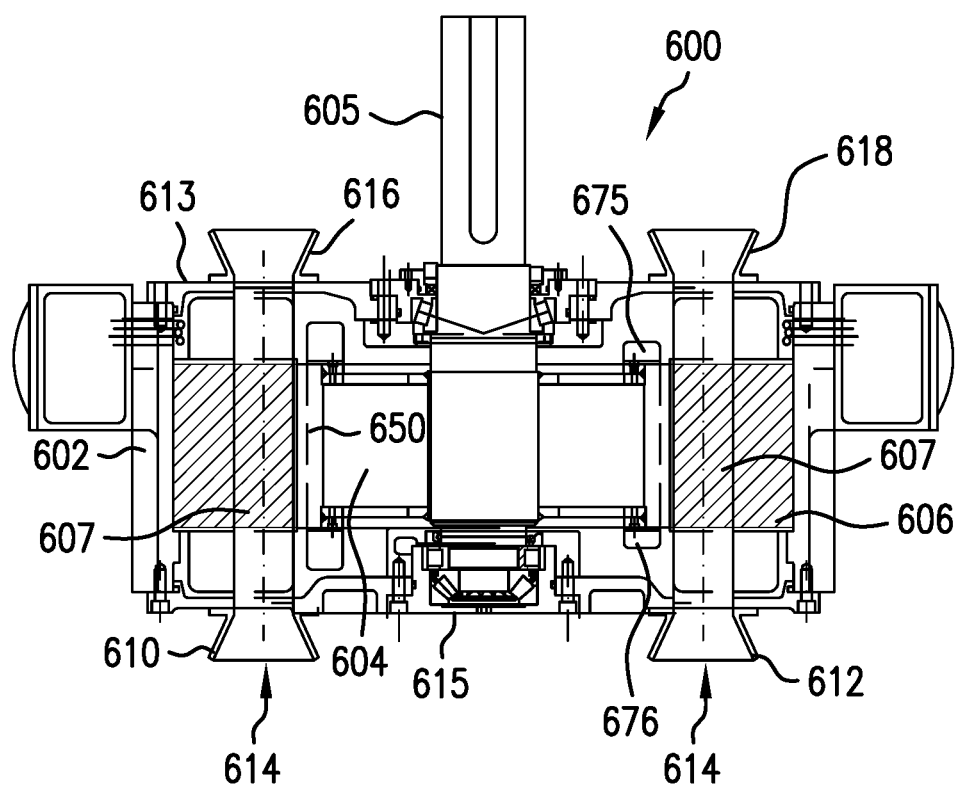
FIG. 11 is a diagram of a motor in accordance with another embodiment of the invention.

Referring to FIG. 11, there is shown motor 600 that incorporates a passive air-cooling embodiment in accordance with another embodiment of the invention. Motor 600 comprises casing 602, rotor 604, shaft 605 and stator 606. Rotor 604 includes a plurality of magnets 650. Stator 606 has the same configuration as stator 408 (see FIG. 9B). Thus, stator 606 comprises continuous ducts 607 which are the same as continuous ducts 420 used in stator 408. Motor 600 further comprises top cover 613 and bottom cover 615. In this embodiment, motor 600 has relatively larger inlet ducts 610 and 612 that are mounted or attached to bottom cover 615 and in communication with the continuous ducts 607 embedded in stator 606. Inlet ducts 610 and 612 channel airflow 614 into the continuous ducts 607 embedded in stator 606. The air flowing into the continuous ducts 607 flows out through exhaust nozzles 616 and 618 which are mounted or attached to top cover 613.

Rotor 604 comprises fan structure 675 that is attached to or integral with the top end of rotor 604 and fan structure 676 that is attached to or integral with the bottom end of rotor 604. Fan structures 675 and 676 have the same structure, function and purpose as fan structures 850 and 852, respectively, that are shown in FIG. 13A and described herein.

In alternate embodiments of the invention, the cooling tubes of FIGS. 8A, 8B, 10A and 10B and continuous ducts of FIGS. 9A, 9B and 11 are sealed at both ends with a phase change material between the sealed ends. The phase change material may include solids, liquids, gases or any combination thereof which effects meets thermal mass requirements to cool and heat the motor. Suitable phase change material is described in U.S. Pat. No. 4,459,949 entitled "Liquid Metal Cooled Internal Combustion Engine Valves With Getter", the disclosure of which patent is hereby incorporated by reference.

Figure 12B:
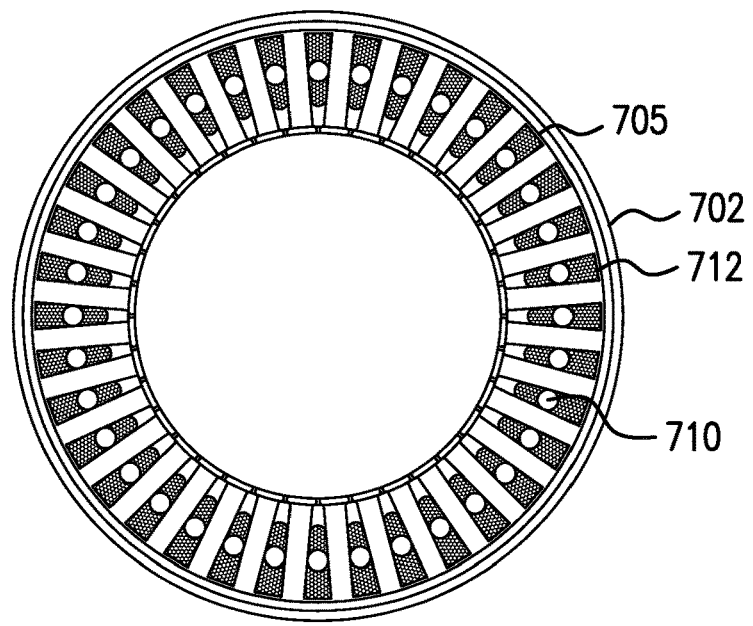
FIG. 12B is a plan view of the stator of the motor of FIG. 12A, the view not showing other motor components in order to simplify the view of the stator.
Figure 12A:
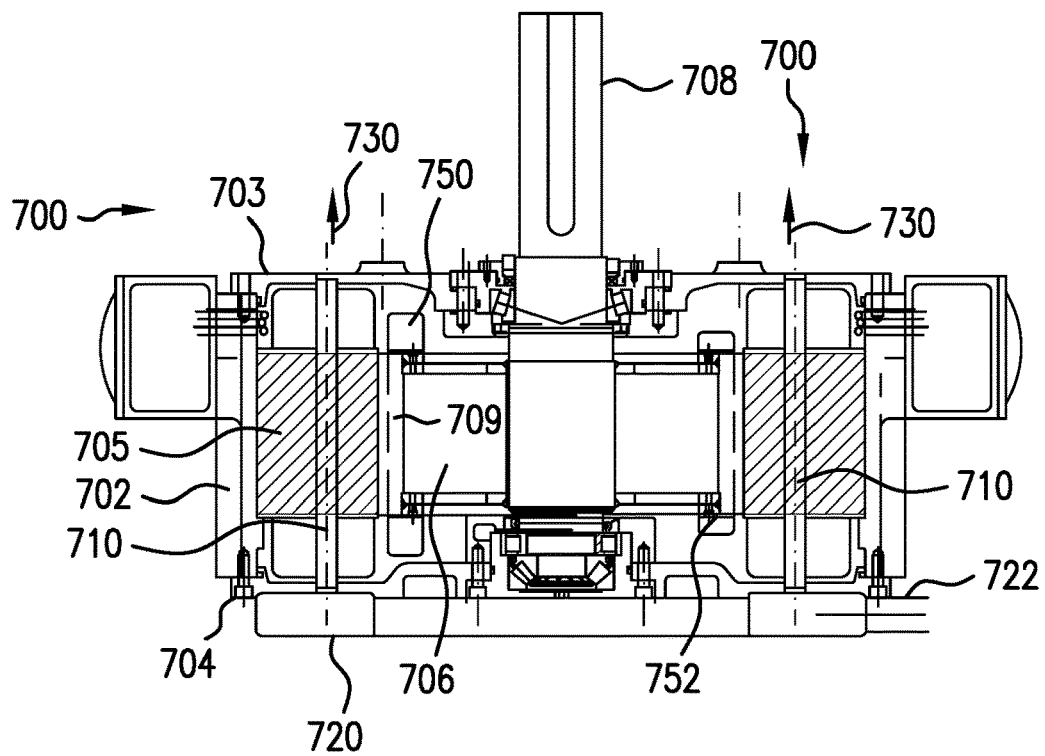
FIG. 12A is a diagram of a motor in accordance with another embodiment of the invention.

Referring to FIGS. 12A and 12B, there is shown motor 700 in accordance with another embodiment of the present invention. Motor 700 comprises casing 702, top cover 703, bottom cover 704, stator 705, rotor 706 and rotor shaft 708. Rotor 706 includes a plurality of permanent magnets 709. In this embodiment, stator 705 has the same configuration and structure as stator 508 shown in FIGS. 10A and 10B. Thus, stator 705 includes cooling tubes 710 which have the same shape and configuration as cooling tubes 515. Cooling tubes 710 are embedded in the slots of the stator stack as winding 712 are inserted into the stack. Cooling tubes 710 are in communication with the external environment of motor 700. Motor 700 includes manifold 720 that is attached to bottom cover 704. Manifold 720 has intake port 722 that receives air from an air source. One such example of a suitable air source is a blower that is located outside the fan stack of the cooling tower. Manifold 720 may be a separate assembly or integral with bottom cover 704. Manifold 720 receives the pressurized air from the air-source outside of the fan stack and distributes the pressurized air into cooling tubes 710. The pressurized air 730 is ejected into the fan airstream by cooling tubes 710.

Rotor 706 comprises fan structure 750 that is attached to or integral with the top end of rotor 706 and fan structure 752 that is attached to or integral with the bottom end of rotor 706. Fan structures 750 and 752 have the same structure, function and purpose as fan structures 850 and 852, respectively, that are shown in FIG. 13A and described herein.

In embodiments in which stator 705 uses continuous cooling tubes configured as cooling tube 216 shown in FIG. 7D, the pressurized air could be regular filtered air from a blower or compressor. The pressurized air would be ejected into the surrounding environment in a manner similar to the embodiments shown in in FIGS. 8A, 8B, 9A and 9B. This embodiment would allow the pressurized air to be either cooled or heated. Cooled air may be supplied from a chiller or a Transvector Jet by Vortec installed in-line with the air source that is outside of the fan stack. Heating of the air also prevents freezing in colder climates.

In alternate embodiments, tubes or ducts having holes therein are embedded in the stator. These embodiments would be used with filtered, clean dry air because the motor is sealed by design and must remain clean of contamination and moisture. The addition of an exhaust nozzle, as show in FIGS. 10A and 11 would enhance the mass flow of air. In an alternate embodiment, exhaust nozzles are replaced or combined with flapper valves or equivalent to seal the motor from contamination. Grainger filters can be combined with flapper valves or equivalent.

Figure 13B:
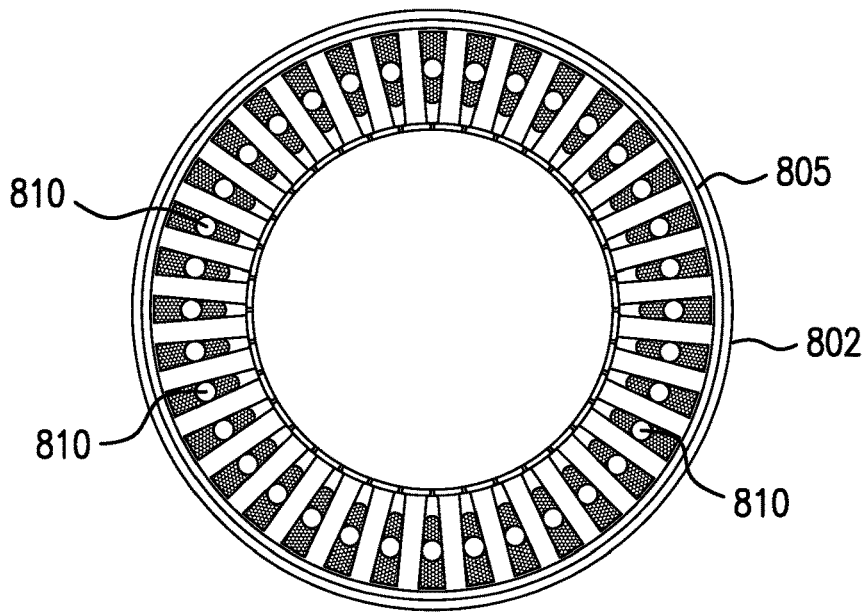
FIG. 13B is a plan view of the stator of the motor of FIG. 13A, the view not showing other motor components in order to simplify the view of the stator.
Figure 13A:
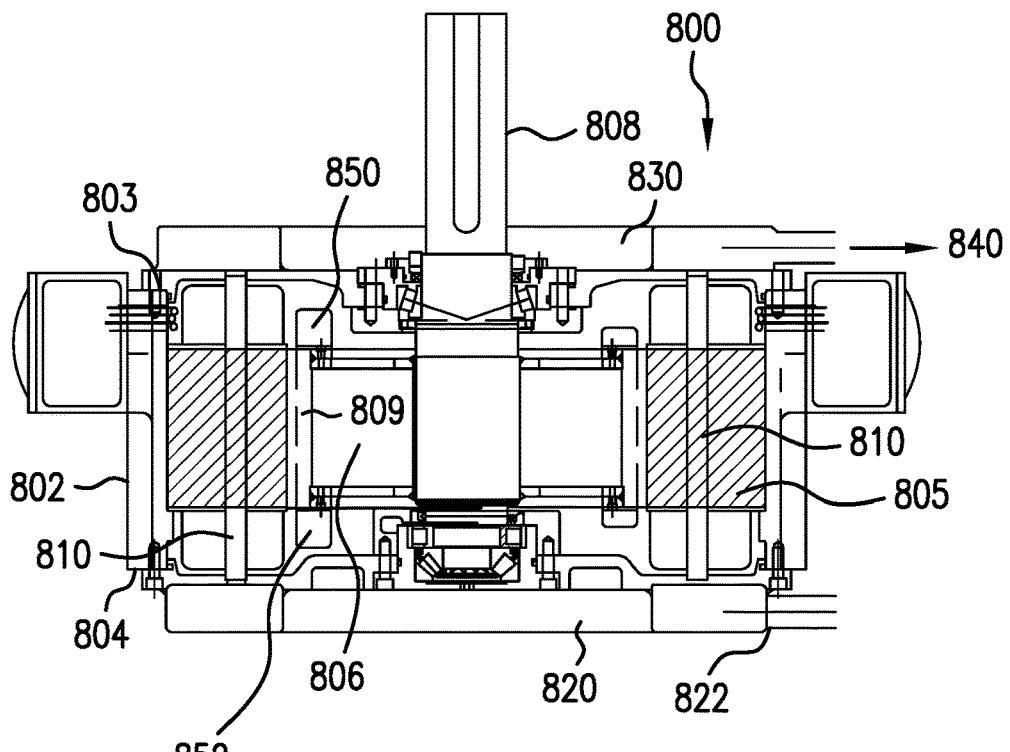
FIG. 13A is a diagram of a motor in accordance with another embodiment of the invention.

Referring to FIGS. 13A and 13B, there is shown motor 800 in accordance with another embodiment of the invention. Motor 800 comprises casing 802, top cover 803, bottom cover 804, stator 805, rotor 806 and rotor shaft 808. Rotor 806 has a plurality of permanent magnets 809. In this embodiment, stator 805 has the same configuration and structure as stator 508 shown in FIGS. 10A and 10B. Thus, stator 805 includes cooling tubes 810 which have the same shape and configuration as cooling tubes 515. Cooling tubes 810 are in communication with the external environment of motor 800. Motor 800 includes inlet manifold 820 that is attached to bottom cover 804. Manifold 820 has intake port 822 that receives clean, dry, filtered air from an air source that is located outside of the fan stack. Suitable air sources include a blower, chiller, heater, compressor, recirculation system, heat exchanger, or combinations thereof. Manifold 820 may be a separate assembly or integral with bottom cover 804. Manifold 820 receives pressurized air from the air-source outside of the fan stack and distributes the pressurized air into cooling tubes 810. Motor 800 further includes outlet manifold 830 that is attached to top cover 803. Outlet manifold 830 receives the pressurized air flowing through cooling tubes 810 and discharges the air 840 outside the fan stack with corresponding piping (not shown).

As shown in FIG. 13A, rotor 806 includes fan structure 850 attached to the top end of rotor 806 and fan structure 852 that is attached to the bottom end of rotor 806. Fan structure 850 includes a plurality of blades or vanes. Similarly, fan structure 852 includes a plurality of blades or vanes. As rotor 806 rotates, fan structures 850 and 852 mix the air around the magnets on rotor 806 and mix the air within the interior of the motor in order to create a heat path from the rotor 806 to casing 802. This configuration causes a transfer of heat from rotor 806 to casing 802.

In another embodiment, each cooling tube 810 is configured to have holes therein to deliver dry, clean, filtered air into the motor cavity which mixes with existing air inside the motor cavity by fan structures 850 and 852 so as to (i) provide heat transfer of either hot or cold air, (ii) collect any moisture within the motor cavity, and (iii) exhaust that air through outlet manifold 830. Outlet manifold 830 discharges the air outside of the fan stack. In one embodiment, outlet manifold 830 discharges the air to a filter that is located outside of the fan stack. One example of such a filter is the Grainer Part Number 3TLA2. This embodiment not only provides thermal management of the motor with heating and cooling options but also provides thermal and motor volume expansion management to maintain motor operating clearances such as rotor-to-stator clearance. This embodiment also maintains sealing integrity and prevents overheating of the motor, especially the temperature sensitive magnets, and prevents freezing of the motor in colder climates. This embodiment allows the use of smaller auxiliary cooling systems that are less costly but highly effective, have smaller footprints and weigh less for places such as cooling towers and skyscrapers that have weight and other structural limitation relative to size and weight. The cooling tubes may be treated with a suitable heat dissipation coating.

In an alternate embodiment, cooling tubes 810 are replaced with continuous ducts of the type shown in FIG. 9B. In one embodiment, the continuous ducts do not have holes therein so that air in the duct does not enter the motor cavity. In another embodiment, the continuous ducts have holes therein to allow air to enter the motor cavity for the reasons stated in the foregoing description.

The cooling tubes and ducts can be custom designed to have various shapes, routings and volumes and may be formed to fit into the available stator lamination slot and other available space in the motor in order to maximize heat transfer from the motor.

In further embodiment, solid tubes are used in stator 805. The solid tubes conduct heat and remove the heat in a manner similar to a radiator or tubes that have various hole configurations that can input air directly to the inside of the motor cavity.

Figure 14B:
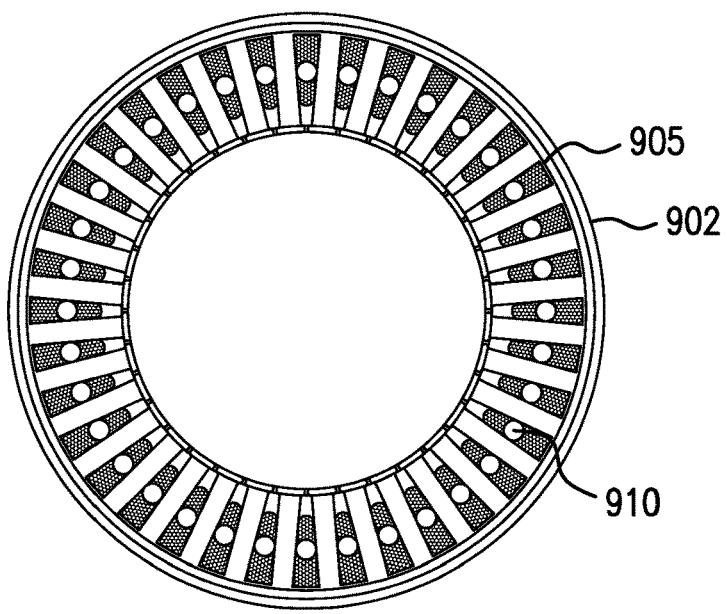
FIG. 14B is a plan view of the stator of the motor of FIG. 14A, the view not showing other motor components in order to simplify the view of the stator.
Figure 14A:
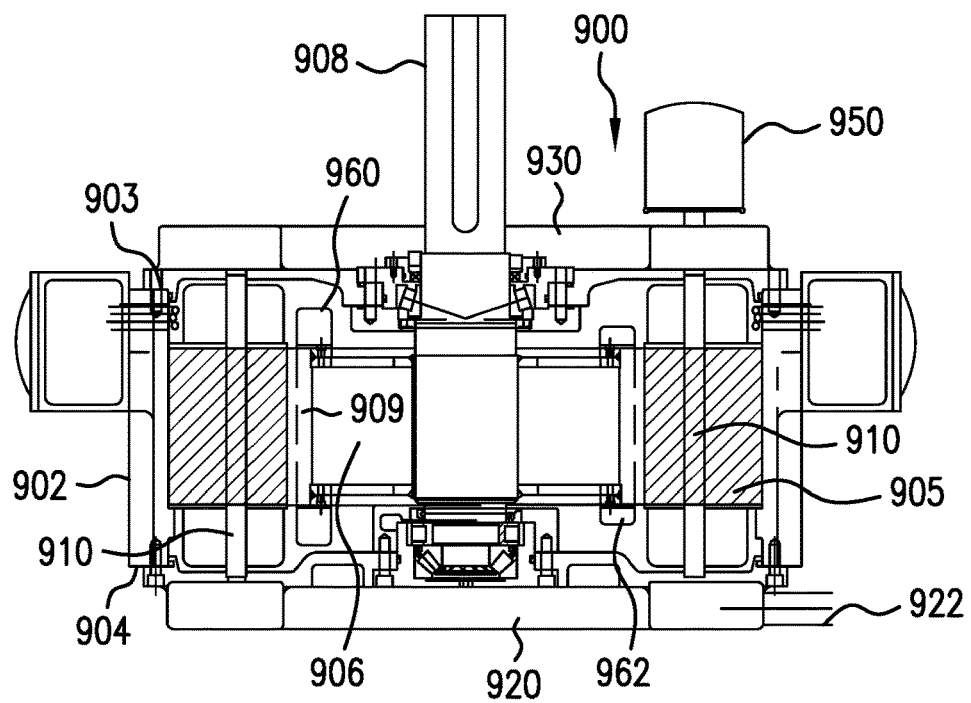
FIG. 14A is a diagram of a motor in accordance with another embodiment of the invention.

Referring to FIGS. 14A and 14B, there is shown another embodiment of the invention. Motor 900 comprises casing 902, top cover 903, bottom cover 904, stator 905, rotor 906 and rotor shaft 908. Rotor 906 includes a plurality of magnets 909. In this embodiment, stator 905 has the same configuration and structure as stator 508 shown in FIGS. 10A and 10B. Thus, stator 905 includes cooling tubes 910 which have the same shape and configuration as cooling tubes 515. Motor 900 includes inlet manifold 920 that is attached to bottom cover 904. Manifold 920 has intake port 922 that receives clean, dry, filtered air from an air source that is located outside of the fan stack. Suitable air sources include a blower, chiller, heater, compressor, recirculation system, heat exchanger, or combinations thereof. Manifold 920 may be a separate assembly or integral with bottom cover 904. Cooling tubes 910 are in communication with manifold 920. Manifold 920 receives pressurized air from the air source located outside of the fan stack and distributes the air into cooling tubes 910. Motor 900 further includes outlet manifold 930 that is attached to top cover 903. Cooling tubes 910 are in communication with outlet manifold 930. Outlet manifold 930 receives the pressurized air flowing through cooling tubes 910 and discharges this air through discharge filter 950 which is connected to outlet manifold 930. In one embodiment, discharge filter 950 has operating characteristics similar to Grainer Part Number 3TLA2 or an equivalent Pall PFD filter. Discharge filter 950 ejects air into the air stream within the fan stack. In another embodiment, discharge filter 950 ejects air outside the fan stack via additional piping or duct work.

In an alternate embodiment, discharge filter 950 is replaced or combined with a flapper valve or equivalent device to prevent contamination and moisture from entering the motor when pressurize air is not present.

In another embodiment, outlet manifold 930 is not used and cooling tubes 910 eject the air directly into an exit filter that is mounted to top cover 903. Such an embodiment is suitable when the direction of air is from top to bottom (see FIG. 1).

In an alternate embodiment, cooling tubes 910 are replaced with continuous ducts of the type shown in FIGS. 9A and 9B.

In other embodiments, cooling tubes 910 are replaced with any of the cooling tubes shown in FIGS. 7A-C, 7E and 7F. In a further embodiment, cooling tubes 910 are replaced with any combination of the cooling tubes shown in FIGS. 7A-C, 7E and 7F.

Rotor 906 comprises fan structure 960 that is attached to or integral with the top end of rotor 906 and fan structure 962 that is attached to or integral with the bottom end of rotor 906. Fan structures 960 and 962 have the same structure, function and purpose as fan structures 850 and 852, respectively, that are shown in FIG. 13A and described herein.

Figure 15A:
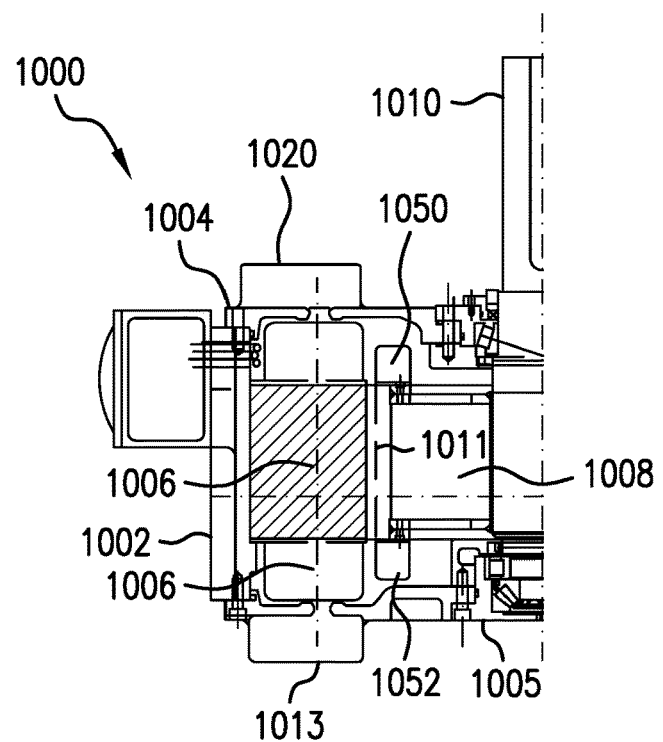
FIG. 15A is a diagram of a motor in accordance with another embodiment of the invention, the view only showing half of the motor in order to simplify the view of the novel features of the motor.

Referring to FIG. 15A, there is shown a partial view of motor 1000 in accordance with another embodiment of the present invention. Motor 1000 comprises casing 1002, top cover 1004 which is attached to casing 1002, bottom cover 1005 which is attached to casing 1002, stator 1006, rotor 1008 and rotatable shaft 1010 which is connected to rotor 1008. Rotor 1008 includes permanent magnets 1011. In this embodiment, stator 1006 does not utilize continuous cooling tubes or ducts as described in the foregoing description. Motor 1000 further comprises intake manifold 1010. In one embodiment, intake manifold 1010 is a separate assembly that is connected to bottom cover 1004. In another embodiment, intake manifold 1010 is integral with bottom cover 1004. Pressurized, clean, dry, filtered air is provided to the intake port (not shown) of manifold 1010 which then delivers this air into the motor cavity. Motor 1000 further comprises outlet manifold 1020 which collects the air out of the motor cavity and ejects the air into the fan stack or outside the fan stack. This is a continuous process wherein pressurized, clean, dry, filtered air is delivered to the motor cavity by intake manifold 1010, the delivered air absorbs heat of the motor components and then the heated air is ejected from the motor 1000 by outlet manifold 1020. In alternate embodiments, discharge filters can be used with the outlet manifold 1020.

Referring to FIG. 15A, rotor 1008 includes fan structure 1050 that is attached to or integral with the top end of rotor 1008 and fan structure 1052 that is attached to or integral with the bottom end of rotor 1008. Fan structures 1050 and 1052 have the same structure, function and purpose as fan structures 850 and 852, respectively, that are shown in FIG. 13A and described herein.

Figure 15B:
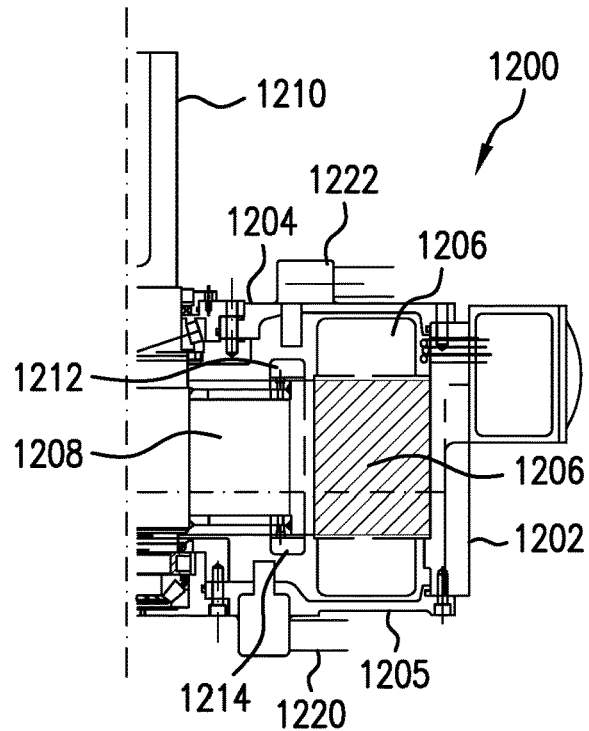
FIG. 15B is a diagram of a motor in accordance with another embodiment of the invention, the view only showing half of the motor in order to simplify the view of the novel features of the motor.

Referring to FIG. 15B, there is shown another embodiment of the invention. Motor 1200 comprises casing 1202, top cover 1204 which is attached to casing 1202, bottom cover 1205 which is attached to casing 1202, stator 1206, rotor 1208 and rotatable shaft 1210 which is connected to rotor 1208. Rotor 1208 has fan structures 1212 and 1214 attached thereto which have the same structure and function as fan structures 850 and 852 shown in FIG. 13A. In this embodiment, stator 1206 does not utilize continuous cooling tubes or ducts as described in the foregoing description. Motor 1200 further comprises air input port 1220 which receives air from an air source located outside the fan stack. One example of a suitable air source is a blower. In one embodiment, air input port 1220 is an air inlet duct. Air input port 1220 may be a separate component or it may be integral with bottom cover 1205. Motor 1200 includes air outlet port 1222 on top cover 1204. Air outlet port 1222 can either be a separate component or it can be integral with top cover 1204. Air input port 1220 delivers the pressurized, clean, dry, filtered air into the motor cavity wherein the delivered air is mixed with the air in the motor cavity by fan structures 1212 and 1214 so as to provide heat transfer and moisture control. The heated pressurized air then leaves the motor cavity via air outlet port 1222 wherein it is discharged outside the fan stack. In an alternate embodiment, a discharge or exit filter is used in place of air outlet port 1222.

Pressurized, dry, filtered air is required in order to prevent contamination and moisture from entering the motor. A Pall PFD Filter used in combination with the pressurized air systems described herein provides a one-way valve with moisture and volume control if the pressurized air is discontinued. Such a combination also maintains the cleanliness of the motor.

Figure 16:
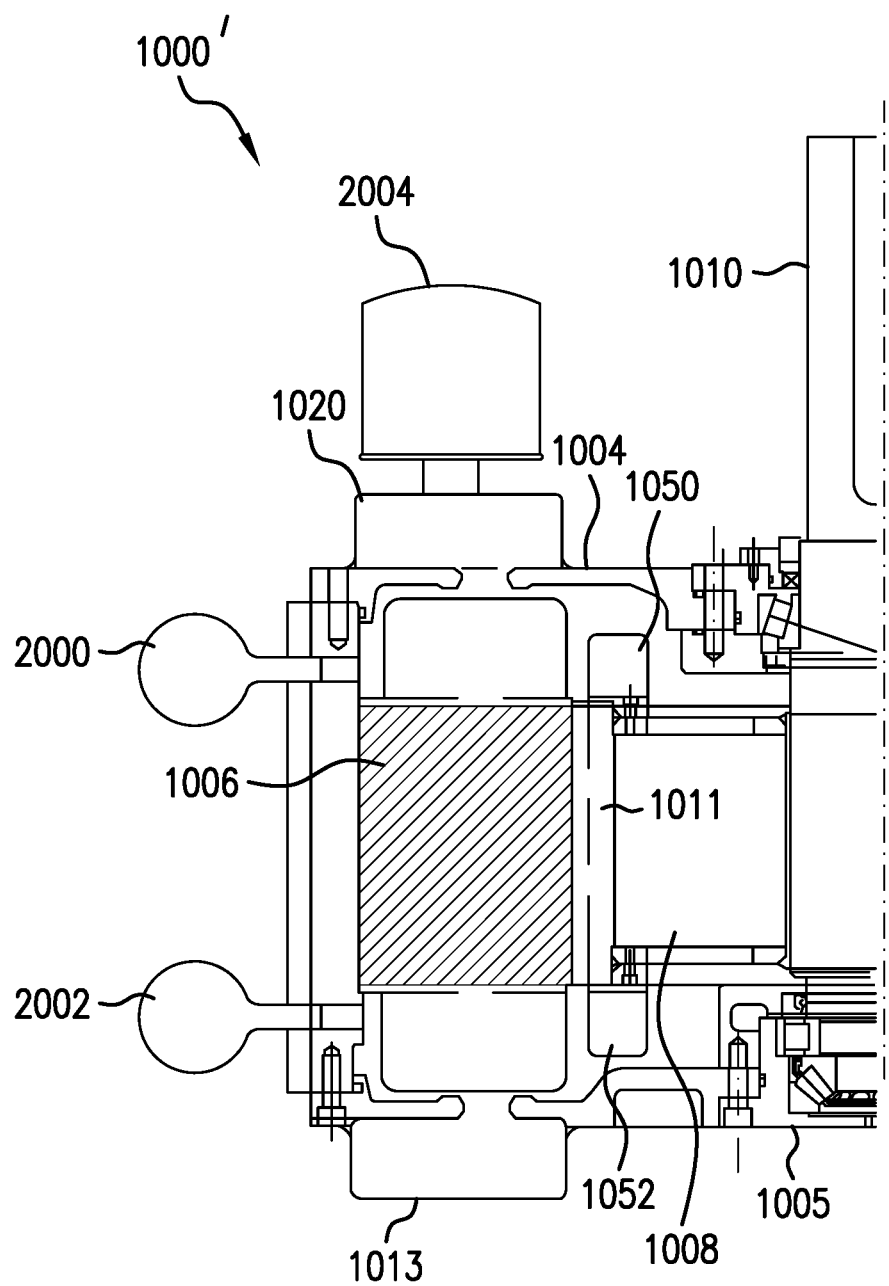
FIG. 16 is a diagram of a motor in accordance with another embodiment of the invention, the view only showing half of the motor in order to simplify the view of the novel features of the motor.

Referring to FIG. 16, there is shown an alternate embodiment of motor 1000 shown in FIG. 15A. Motor 1000' includes all of the components of motor 1000 in FIG. 15A with the addition of external manifolds 2000 and 2002, and air outlet vent filter 2004. External manifolds 2000 and 2002 are located as required to move air and water into and out of motor 1000' as previously discussed herein for heating, cooling, and controlling moisture and volume. Although two external manifolds are shown, it is to be understood that more than two external manifolds can be used.

External manifolds can be used in several of the foregoing embodiments in order to satisfy motor thermal design requirements. For example, in the embodiment shown in FIG. 15B, motor 1200 can be modified by adding one or more external manifolds.

The external manifolds can be used to deliver air or water into the cooling tubes or ducts in the motor at any point of entry and be used with any combination of the continuous cooling tubes or ducts described in the foregoing description.

Figure 17:
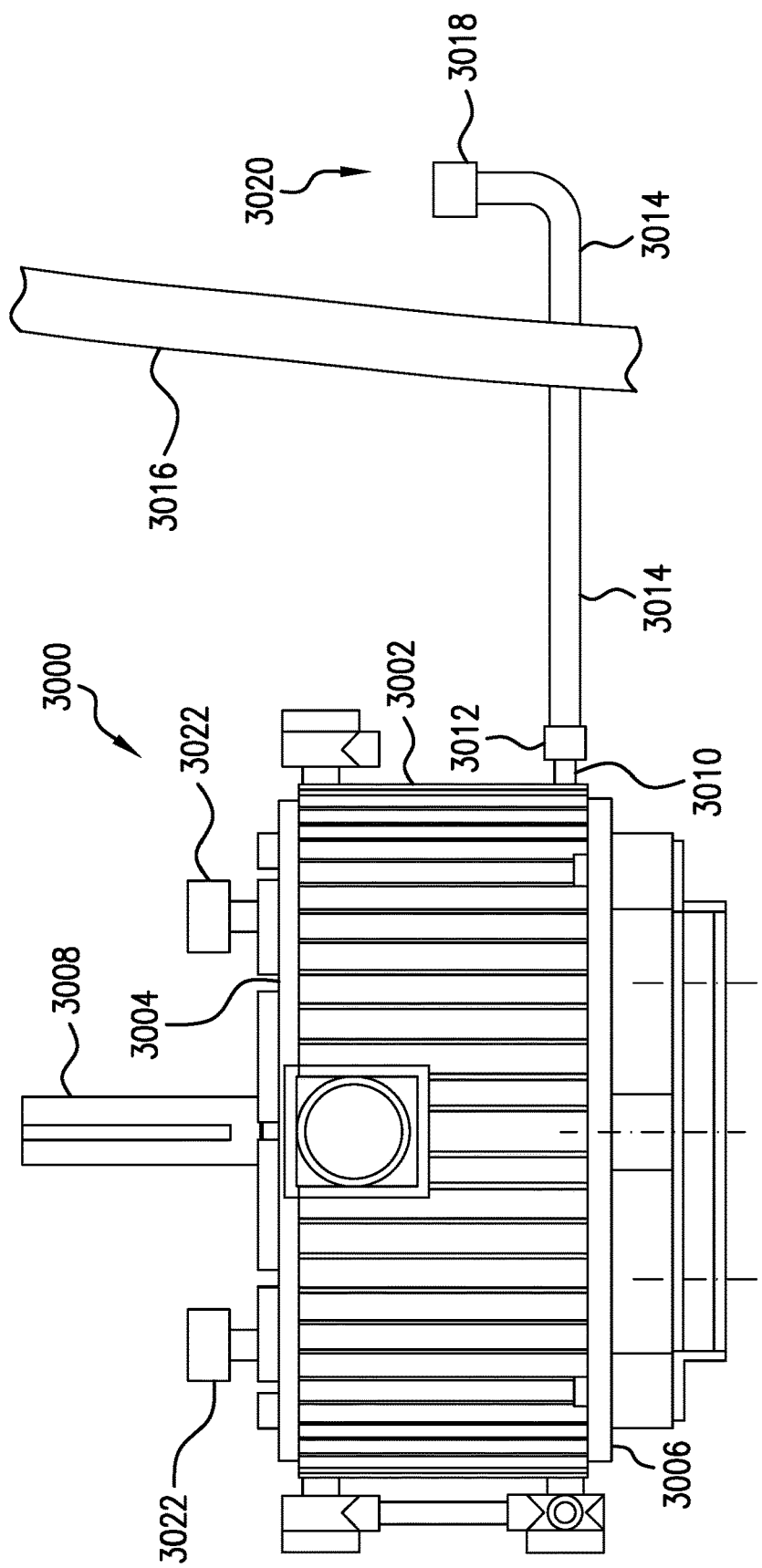
FIG. 17 is a side view, in elevation, of a motor in accordance with another embodiment of the invention.

Referring to FIG. 17, there is shown motor 3000 in accordance with an alternate embodiment of the present invention. This embodiment utilizes Vortec air-amp cooling.

Motor 3000 comprises casing 3002, top cover 3004, bottom cover 3006, a rotor (not shown), a stator (not shown) and a rotatable shaft 3008 which is connected to the rotor. This embodiment provides dry, filtered cool air to the motor cavity via the expansion of air through the Vortec device from a compressed air source. Adapter 3010 is connected to motor casing 3002. An air amplifier device 3012 is connected to adapter 3010. Air tube 3014 is connected to air amplifier device 3012. Air tube 3014 extends outside fan stack 3016. Fan stack 3016 is only partially shown in FIG. 17. A complete fan stack is shown in FIG. 1. An air inlet filter 3018 is connected to the end of air tube 3014. A suitable air inlet filter is the Grainger PN 3TLA5 inlet filter. Cool dry air 3020 enters inlet filter 3018, flows through tube 3014, through air amplifier device 3012 and into the motor cavity wherein it mixes with the air in the motor cavity so as to provide heat transfer, moisture and volume control. As the input air is heated by heat transfer process, it exits the motor cavity by at least one outlet filter 3022. In one embodiment, outlet filter 3022 is mounted on top cover 3004 as shown. In another embodiment, the outlet filter 3022 is located outside the fan stack and a pipe routes the discharged air from casing 3002 to the outlet filter. In another embodiment, a Pall PFD Filter is used in combination with inlet filter 3018. The Pall PFD Filter includes the required valve arrangement that prevents contamination and moisture from entering the motor through inlet filter 3018.

Figure 18B:
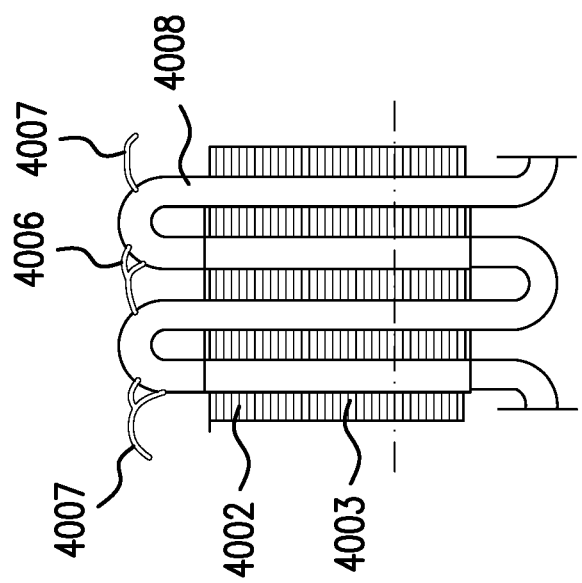
FIG. 18B is a diagram of the serpentine cooling tubes used in the stator of FIG. 18A.
Figure 18A:
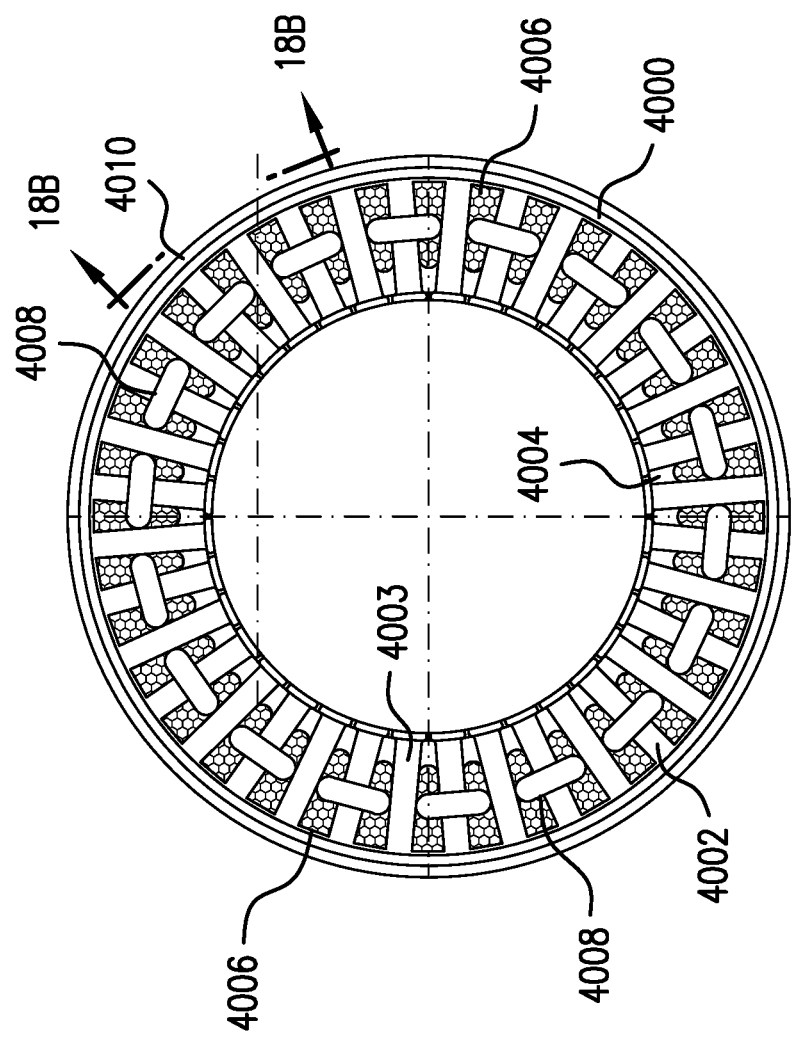
FIG. 18A is plan view of a stator in accordance with another embodiment of the invention.

Referring to FIGS. 18A and 18B, there is shown a stator 4000 in accordance with another embodiment of the invention. Stator 4000 comprises a plurality of lamination sheets 4002 that are bonded or attached together to form a stator stack 4003. Stator stack 4003 has slots 4004. Stator 4000 includes windings or coils 4006 that are wound about stator stack 4003. Coils 4006 include end turns 4007. Stator 4000 is pinned or attached to the interior wall of casing 4010. Stator 4000 is includes serpentine cooling tubes 4008 that can transfer air, water and other fluids (e.g. ammonia) through the motor to cool or heat the motor. Serpentine cooling tubes 4008 are embedded into windings 4006. Stator 4000 can be configured with a single run or multiple run of serpentine cooling tubes or ducts throughout the stator stack 4003. The serpentine cooling tubes can be routed throughout the motor based on the thermal requirements of the motor. In other embodiments, any suitable conduit of any cross-sectional shape may be used in place of round tubes. Suitable materials for fabricating the serpentine cooling tubes are materials that have high thermal conductivity for heat transfer and acceptable electrically insulating properties. Such materials include Silicone, Teflon and other high temperature plastics. Copper and stainless steel are suitable choices only when the motor components (e.g. windings or coils) are sealed and insulated such as by Vacuum Pressure Impregnation (VPI). If Silicone and Teflon are used to form the serpentine cooling tubes or ducts, then the stator windings need not be VPI-processed and the serpentine cooling tubes or ducts may be nested directly in the windings. Silicone or Teflon serpentine cooling tubes or ducts are electrically insulated and offer excellent thermal conductivity to transfer heat away from the windings, prevent damage to the rotor and the magnets, and maintain thermal balance within the motor for proper and efficient operation. Since the motors in the foregoing embodiments are sealed to prevent contamination and manage moisture within the motor, VPI processing is not required. When VPI processing is not used, or when VPI coatings are removed from the windings, Silicone or Teflon serpentine tubing or ducts provide significantly improved thermal management.

In one embodiment, the serpentine cooling tubes are run into 180 degree unions located and fixed in the motor to allow them to expand and contract similar to straight tubes.

In alternate embodiments, serpentine tubing or ducts made from stainless steel or copper are insulated with an insulating wrapping material and then wound with the stator coils. Then, the serpentine tubing or ducts and stator coils are then VPI processed.

In an alternate embodiment, serpentine tubing or ducts made from stainless steel or copper are wrapped in a thermally conductive and electrically insulating coil wrap. One suitable coil wrap is the Arlon SFT Self Fusing Tape.

In alternate embodiments, fluid inlet and outlet taps are utilized to connect tubing or duct sections formed in the coil to create a cooling circuit in the motor. The motor may have more than one cooling circuit.

In an alternate embodiment, serpentine cooling tubes or ducts can be used to contain a phase transfer medium.

In an alternate embodiment, the serpentine cooling tubes or ducts are configured with holes so that the serpentine cooling tubes or ducts can transfer clean, dry, filtered air to the motor.

Figure 19B:
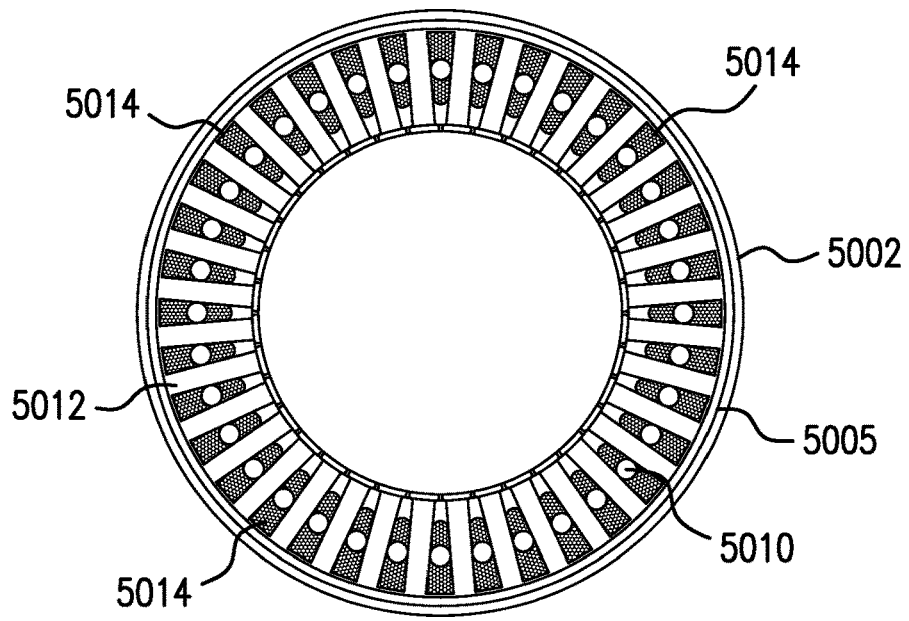
FIG. 19B is a plan view of the stator of the motor of FIG. 19A, the view not showing other motor components in order to simplify the view of the stator.
Figure 19A:
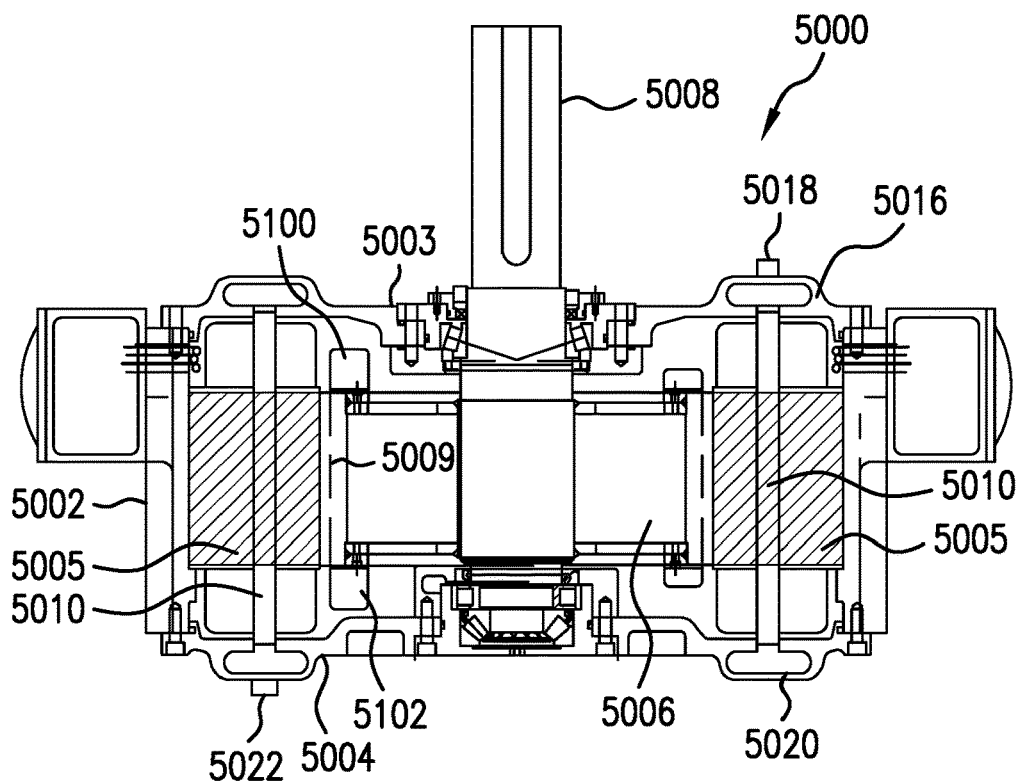
FIG. 19A is a diagram of a motor in accordance with another embodiment of the invention.

Referring to FIGS. 19A and 19B, there is shown motor 5000 in accordance with another embodiment of the present invention. Motor 5000 employs a forced-water cooling scheme. The motor 5000 comprises casing 5002, top cover 5003, bottom cover 5004, stator 5005, rotor 5006 and rotor shaft 5008. Rotor 5006 includes permanent magnets 5009. In this embodiment, stator 5005 has the same configuration and structure as stator 705 in FIG. 12A. Thus, stator 5005 includes cooling tubes 5010 that have the same shape and configuration as cooling tubes 710. Stator 5005 comprises a plurality of lamination sheets that are stacked together to form stator stack 5012. Cooling tubes 5010 are embedded in stator stack 5012 as windings 5014 are inserted. Motor 5000 further comprises a circumferentially extending upper fluid manifold 5016 that is attached to or integral with top cover 5003. The top openings of cooling tubes 5010 are in communication with upper fluid manifold 5016. Fluid manifold 5016 includes fluid inlet 5018 so that fluid (e.g. water) can be delivered to upper fluid manifold 5016. The motor 5000 further comprises circumferentially extending lower fluid manifold 5020 that is attached to or integral with bottom cover 5004. The bottom openings of cooling tubes 5010 are in communication with lower fluid manifold 5020. Lower fluid manifold 5020 has fluid outlet 5022 through which fluid exits. During operation, pressurized fluid (e.g. water) from a cooling tower source is delivered to fluid manifold 5016 via fluid inlet 5018. The fluid passes through cooling tubes 5010 and absorbs heat from the stator windings 5014. The heated fluid then passes out of cooling tubes 5010 and into lower fluid manifold 5020 and wherein it is then discharged through fluid outlet 5022. In a preferred embodiment, the fluid that is inputted into upper fluid manifold 5016 is filtered water. In a preferred embodiment, the water is obtained from the cooling tower system. For example, in one embodiment, water from the cooling tower distribution system is filtered and then inputted into fluid inlet 5018. The water that is discharged from fluid outlet 5022 is then recirculated back into the cooling tower for cooling. In another embodiment, the water discharged from fluid outlet 5022 is recirculated with a heat exchanger and exchanged with water drawn from a cooling tower source. Drawing water directly from the cooling tower eliminates the use of conventional auxiliary cooling devices.

In alternate embodiments, cooling tubes 5010 are replaced with conduits having cross-sectional shapes other than round. In an alternate embodiment, cooling tubes 5010 are replaced by cooling ducts.

Rotor 5006 includes fan structures 5100 and 5102 which have the same structure, function and purpose as fan structures 850 and 852, respectively, that are shown in FIG. 13A and described herein.

The embodiment shown in FIGS. 19A and 19B may incorporate thermostats, valves, sensors and solenoids to automatically adjust the water temperature in the motor. In an alternate embodiment, heated water is passed through cooling tubes 5010 in order to prevent the motor from freezing. Such an embodiment is suitable for use in geographical areas that experience very cold temperatures. In one embodiment, the embodiments shown in FIGS. 19A and 19B may be used with the control system described in international application no. PCT/US2012/061244 entitled "Direct Drive Fan System With Variable Process Control" and published under International Publication No. WO 2013/059764.

In a preferred embodiment, the cooling tower water is used with a heat exchanger so that the closed loop fluid circulated in cooling tubes or ducts can be mixed with an anti-freeze as required for cold service. In a further embodiment, the pressurized hot water returned from the process can be combined with the pressurized return of cooler water from the basin feed to the process to provide a suitable temperature via mixing valves and thermostats. A third make-up water source can be used as required to provide a suitable temperature to the motor (hot or cold) to maintain optimum motor efficiency through various environmental conditions and process loads similar to an automobile radiator and thermostat.

Figure 20B:
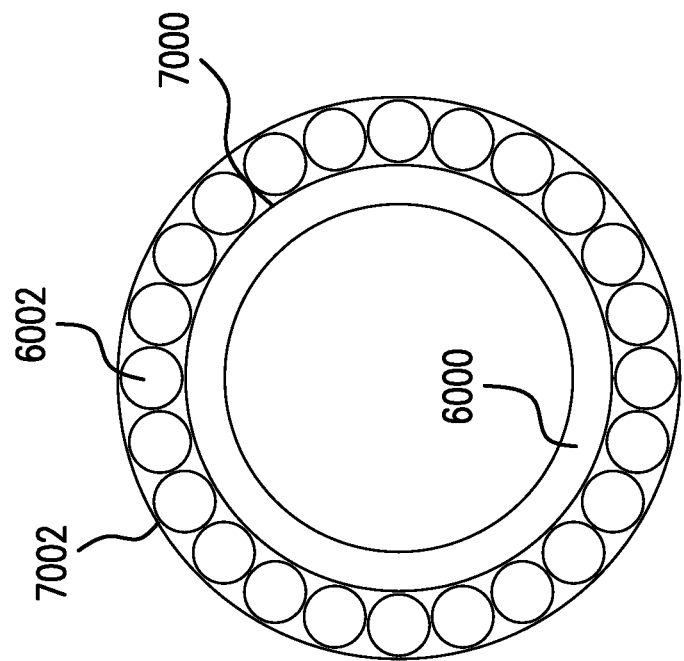
FIG. 20B is a diagram showing an electrically insulative layer of material wrapped about a cooling tube, stator windings wrapped about the electrically insulative layer of material and an additional electrically insulative layer wrapped about the stator windings.
Figure 20A:
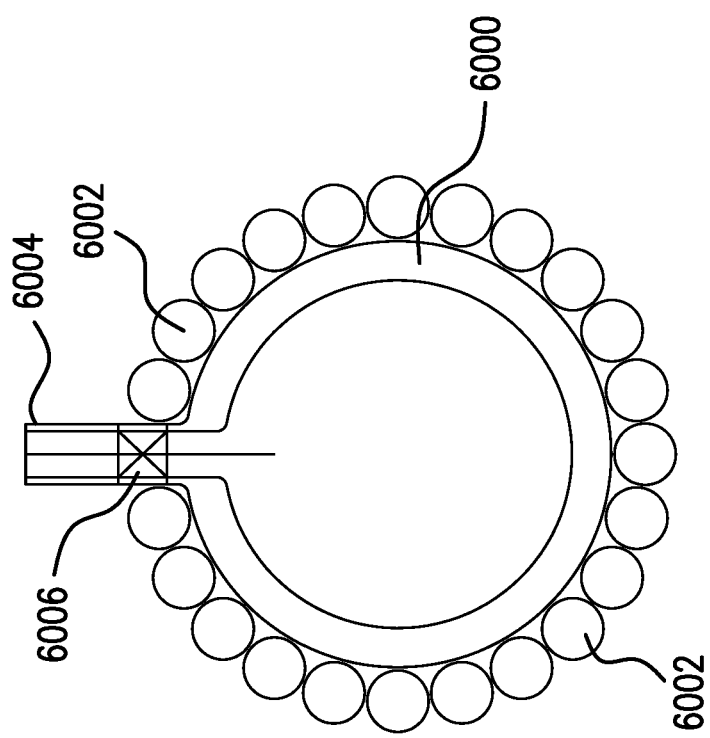
FIG. 20A is a diagram showing stator windings wrapped about a cooling tube.

Referring to FIG. 20A, there is shown another embodiment of the present invention. In this embodiment, a motor stator comprises a cooling tube 6000 that is wrapped with individual stator coils 6002 or coil bundles and disposed in the slots of the stator lamination stack. The view shown in FIG. 20A is that of a cooling tube 6000 wrapped with stator coils 6002. In such an embodiment, heat is transferred from coils 6002 to the cooling tube 6000. Tap riser 6004 delivers air, gases and/or fluids (or combinations thereof) to cooling tube 6000. Tap riser 6004 is insulated from the electric circuit by isolation stack 6006. Cooling tube 6000 may be made from copper, aluminum, silicone, Teflon or equivalent, and may be part of the motor's electric circuit or insulated from the electric circuit. The entire assembly (e.g. cooling tube 6000 wrapped with coils 6002) can be potted and insulated as required using a manual or VPI process. Solid tubes, gas and liquid filled tubes can act as heat sinks and work with the heat-pipe embodiments described in the foregoing description. If cooling tubes 6000 are made from materials that are not electrically conductive, then isolation stacks 6006 are not required. Such non-electrically conductive materials include Teflon and Silicone. Cooling tubes 6000 may be used to transfer air, gasses, water, fluids or combinations thereof for cooling stator coils and for heating the coils when the motor is used in cold environments. In an alternate embodiment, cooling tubes 6000 contain a phase change transfer medium.

In alternate embodiments, cooling tubes 6000 are replaced by cooling ducts, described in the foregoing description, or any other conduit having a different cross-sectional shape.

FIG. 20B is an alternate embodiment of the configuration shown in FIG. 20A wherein the cooling tubes 6000 are isolated from the electric circuit of the motor. In this embodiment, an isolation layers 7000 and 7002 are thermally conductive. Stator coils 6002 are wrapped about isolation layer 7000 and cooling tube 6000. An additional isolation layer 7002 is wrapped about stator coils 6002.

Figure 21A:
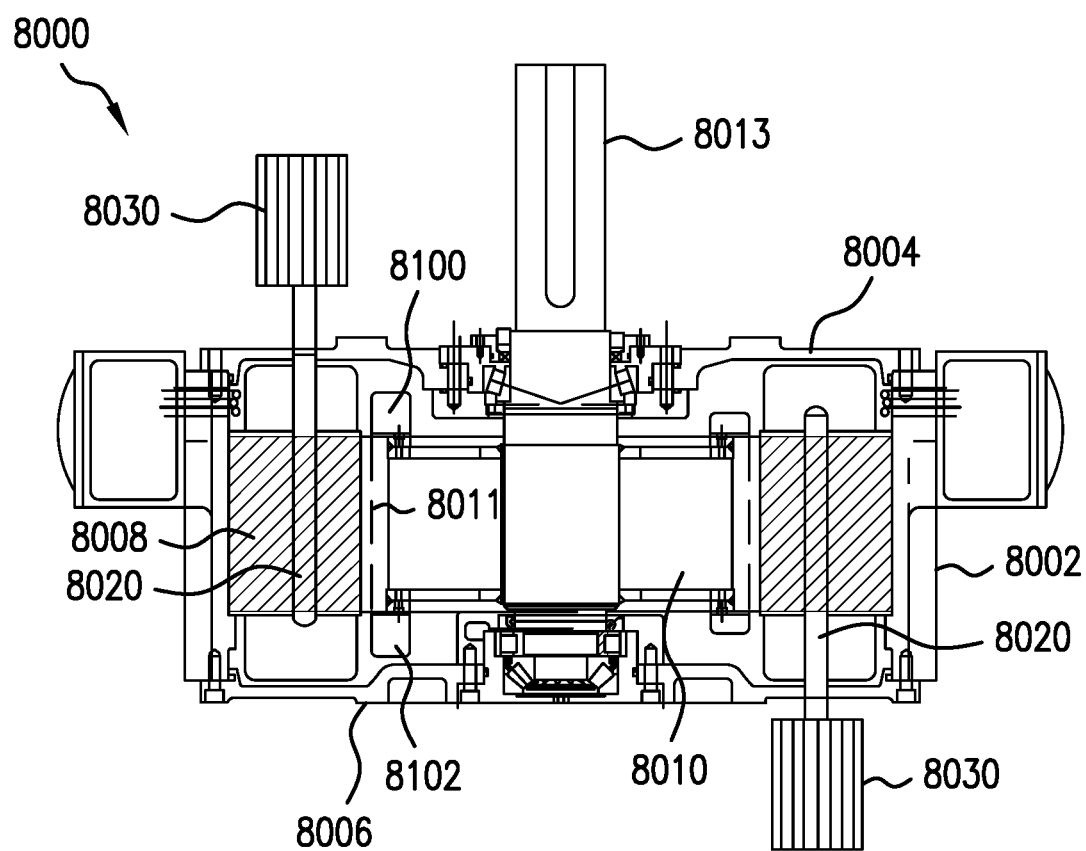
FIG. 21A is a diagram of a motor in accordance with another embodiment of the invention.
Figure 21B:
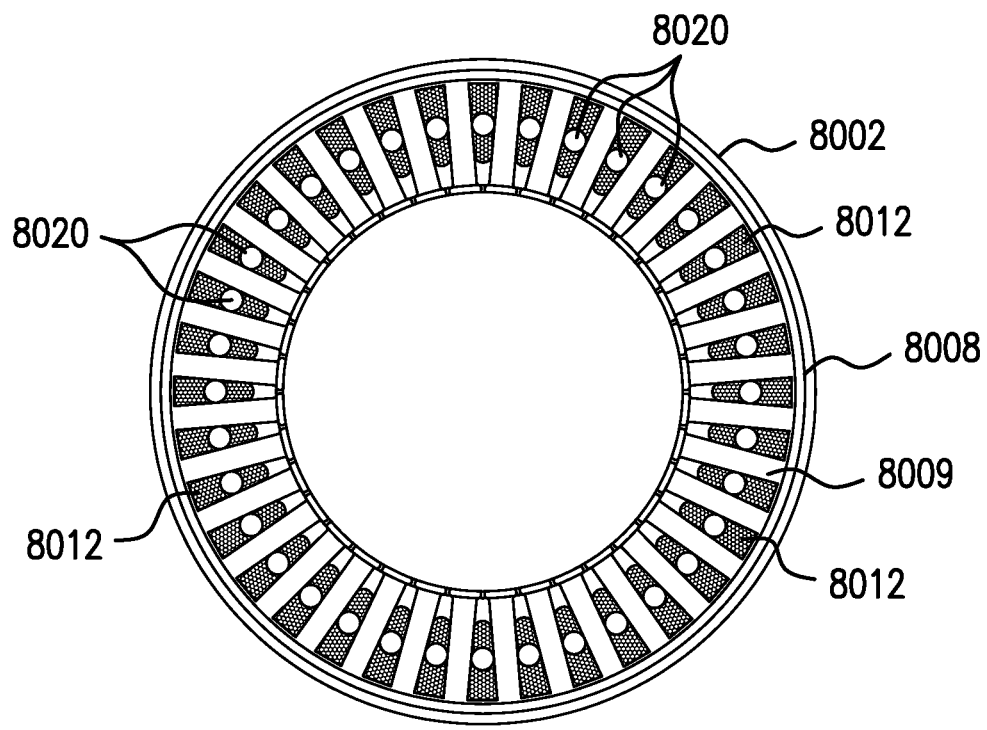
FIG. 21B is a plan view of the stator of the motor of FIG. 19A, the view not showing other motor components in order to simplify the view of the stator.
Figure 21C:
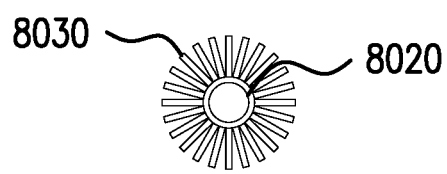
FIG. 21C is a plan view of a heat pipe and heat sink shown in FIG. 21A.

Referring to FIGS. 21A, 21B and 21C, there is shown an alternate motor embodiment of the present invention. The motor 8000 comprises casing 8002, top cover 8004, bottom cover 8006, stator 8008, rotor 8010 and rotatable shaft 8013 that is connected to rotor 8010. Rotor 8010 includes permanent magnets 8011. Stator 8008 comprises a stator stack 8009 that is formed by a plurality of lamination sheets as described in the foregoing description. Coils 8012 are wound about stator stack 8009. The motor 8000 further comprises a plurality of heat pipes 8020 that are embedded into coils 8012 and end turns of the coils 8012. Heat pipes are well known in the industry and are therefore not described in detail herein. The heat pipes 8020 remove heat from the motor and ejected it to the surrounding fan stream which is comprised of significant mass air flow of 100% humid air by design in wet cooling towers. Heat pipes 8020 can be positioned so some of the heat pipes 8020 extend upward and other heat pipes 8020 extend downward as shown in FIG. 21A. In one embodiment, 50% of the heat pipes 8020 extend upward and the remaining 50% of the heat pipes extend downward. In one embodiment, the heat pipes 8020 are arranged so that every other heat pipe 8020 extends upward and the remaining heat pipes 8020 extend downward. In one embodiment, a heat sink 8030 is attached to each heat pipe 8020 as shown in FIGS. 21A and 21C.

Rotor 8010 includes fan structures 8100 and 8102 which have the same structure, function and purpose as fan structures 850 and 852, respectively, that are shown in FIG. 13A and described herein.

Heat pipes can be combined with at least some of the other foregoing embodiments, such as the aforementioned serpentine cooling tubes for removing heat out of the motor. Heating pipes of any orientation and combination and could be located further into the fan air stream.

In another embodiment, the motor comprises chill blocks that are in contact with the end turns of the windings. In such an embodiment, the heat pipes are embedded in the chill blocks.

The foregoing embodiments allow for thermal management of the motor in the cooling tower. Thus, if motor performance begins to degrade, the present invention allows for changes in the thermal management of the motor to improve or maintain performance. This allows each motor in each cooling tower to be optimize for thermal conditions. The ability to thermally manage the motor also facilitates maintaining a desired rotor-to-stator gap (e.g. 0.030 inch, 0.060 inch).

Cooling tubes and heating pipes discussed in the foregoing description can be relatively small in diameter and can be embedded into coils, thermally conductive potting in the gap between the stator and the motor casing, rotors and other motor structure during or after winding the coils on the stator. Motors may be designed to allow room within the motor for routing tubes, pipes, ducts and serpentine cooling tubes through the motor, without being embedded into the coils, and through the slots where "slot fill" is typically applied. The term "slot fill" refers to empty volumes in the motor which are not taken up by windings or coils and are therefore not part of the electrical circuit in the motor.

In an alternate embodiment, a water plenum is integrated with the motor cover (e.g. top cover) to provide cooling tower water for cooling the motor. The cooling tower water can be fed into any of the foregoing cooling tubes, ducts, serpentine tubes and ducts or any combination thereof. The use of the cooling tower water that is readily available from the header simplifies the cooling process and avoids the use of secondary auxiliary pumps, valves, controls and skids which can be costly and add significant weight to the cooling tower.

In any of the foregoing embodiments involving forced water cooling, the water exiting the motor can be recirculated, or discharged in whole back into the cooling tower, or mixed with new water, as required according to the heat transfer characteristics and the conditions under which the motor must operate. Such configurations also facilitate heating the motor in very cold climates to prevent the motor from freezing.

In other embodiments, mixing valves and control devices can be used to maintain predetermined water temperatures according to motor operating parameters, water temperature and environmental stress in order to optimize motor efficiency.

In other embodiments, a closed Glycol loop or equivalent and a heat exchanger device is used to provide cooling water, air, ocean water or other medium to cool the motor.

It is to be understood that many commercially available surface treatments and chemical compounds may be used on the components of the motors of any of the foregoing embodiments of the invention in order to dissipate heat or retain heat as certain locations within the motor. Such surface treatments and chemical compounds include thermal barrier coatings, thermally conductive epoxies, epoxy resins, thermally conductive potting, thermally conductive insulators and heat dissipation coatings.

All of the motor embodiments disclosed herein may be used with or controlled by the control system described in international application no. PCT/US2012/061244 entitled "Direct Drive Fan System With Variable Process Control" and published under International Publication No. WO 2013/059764.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A cooling tower comprising:
a cooling tower structure;
a motor supported by the cooling tower structure, the motor comprising a motor casing and a rotatable shaft;
a cooling tower fan directly driven by the rotatable shaft and comprising a fan hub and a plurality of fan blades attached to the fan hub, the fan hub having a bottom side;
a supplemental fan attached to the bottom side of the fan hub such that the supplemental fan is between the fan hub and the motor; and
whereby rotation of the cooling tower fan causes rotation of the supplemental fan which increases airflow around the casing of the motor.

2. The cooling tower according to claim 1 further comprising a fan pitch adjustment device on the cooling tower fan to adjust the pitch of the supplemental fan.

3. A motor comprising a casing, a rotatable shaft and a main fan attached to the rotatable shaft, the main fan comprising a fan hub and a plurality of fan blades attached to the fan hub, the fan hub having a bottom side, the motor further comprising a supplemental fan attached to the bottom side of the fan hub such that the supplemental fan is between the fan hub and the motor, whereby rotation of the main fan causes rotation of the supplemental fan which increases air flow around the casing of the motor.

* * * * *